(12) United States Patent
Wang et al.

(10) Patent No.: US 9,205,468 B2
(45) Date of Patent: Dec. 8, 2015

(54) MICROFLUIDIC DEVICE REGENERATION

(75) Inventors: Jing Wang, Daly City, CA (US); Timothy M. Woudenberg, Moss Beach, CA (US)

(73) Assignee: Fluidigm Corporation, South San Francisco, CA (US)

( * ) Notice: Subject to any disclaimer, the term of this patent is extended or adjusted under 35 U.S.C. 154(b) by 803 days.

(21) Appl. No.: 13/516,146

(22) PCT Filed: Nov. 30, 2010

(86) PCT No.: PCT/US2010/058459
§ 371 (c)(1),
(2), (4) Date: Jan. 24, 2013

(87) PCT Pub. No.: WO2011/066588
PCT Pub. Date: Jun. 3, 2011

(65) Prior Publication Data
US 2013/0186433 A1    Jul. 25, 2013

Related U.S. Application Data

(60) Provisional application No. 61/265,325, filed on Nov. 30, 2009.

(51) Int. Cl.
*B08B 9/027* (2006.01)
*B01L 3/00* (2006.01)
*B01L 99/00* (2010.01)
*F16K 99/00* (2006.01)

(52) U.S. Cl.
CPC ............... *B08B 9/027* (2013.01); *B01L 3/5027* (2013.01); *B01L 99/00* (2013.01); *B01L 2300/123* (2013.01); *B01L 2400/0481* (2013.01); *B01L 2400/0655* (2013.01); *F16K 99/0001* (2013.01); *F16K 99/0026* (2013.01); *F16K 99/0059* (2013.01); *F16K 2099/008* (2013.01); *F16K 2099/0074* (2013.01); *F16K 2099/0078* (2013.01); *F16K 2099/0084* (2013.01)

(58) Field of Classification Search
None
See application file for complete search history.

(56) References Cited

U.S. PATENT DOCUMENTS

| | | |
|---|---|---|
| 5,994,696 A | 11/1999 | Tai et al. |
| 6,069,392 A | 5/2000 | Tai et al. |
| 6,221,654 B1 | 4/2001 | Quake et al. |
| 6,301,055 B1 | 10/2001 | Legrand et al. |
| 6,344,325 B1 | 2/2002 | Quake et al. |
| 6,345,502 B1 | 2/2002 | Tai et al. |
| 6,408,878 B2 | 6/2002 | Unger et al. |
| 6,508,988 B1 | 1/2003 | Van Dam et al. |
| 6,540,895 B1 | 4/2003 | Spence et al. |
| 6,560,030 B2 | 5/2003 | Legrand et al. |

(Continued)

OTHER PUBLICATIONS

Office Action for Chinese Patent Application No. 201080060206.3, mailed on Sep. 28, 2014, 10 pages.

*Primary Examiner* — Jill Warden
*Assistant Examiner* — Timothy G Kingan
(74) *Attorney, Agent, or Firm* — Kilpatrick Townsend & Stockton LLP

(57) ABSTRACT

A method for rendering a microfluidic device suitable for reuse for nucleic acid analysis is provided. The method may include flowing a nucleic acid inactivating solution into a microfluidic channel of the device by pumping; and then flowing a wash solution into the channel by pumping, thereby displacing the nucleic acid inactivating solution from the channel, whereby any residual nucleic acid from a prior use of the device is inactivated.

20 Claims, 14 Drawing Sheets

(56) References Cited

U.S. PATENT DOCUMENTS

| | | |
|---|---|---|
| 6,608,726 B2 | 8/2003 | Legrand et al. |
| 6,614,598 B1 | 9/2003 | Quake et al. |
| D486,156 S | 2/2004 | Lee et al. |
| 6,709,604 B2 | 3/2004 | Tai et al. |
| D488,818 S | 4/2004 | Lee et al. |
| 6,752,922 B2 | 6/2004 | Huang et al. |
| 6,767,706 B2 | 7/2004 | Quake et al. |
| 6,793,753 B2 | 9/2004 | Unger et al. |
| 6,802,342 B2 | 10/2004 | Fernandes et al. |
| 6,818,395 B1 | 11/2004 | Quake et al. |
| 6,829,753 B2 | 12/2004 | Lee et al. |
| 6,833,242 B2 | 12/2004 | Quake et al. |
| 6,836,384 B2 | 12/2004 | Legrand et al. |
| 6,841,096 B2 | 1/2005 | Quake et al. |
| 6,885,982 B2 | 4/2005 | Harris et al. |
| 6,899,137 B2 | 5/2005 | Unger et al. |
| 6,929,030 B2 | 8/2005 | Unger et al. |
| 6,951,632 B2 | 10/2005 | Unger et al. |
| 6,953,058 B2 | 10/2005 | Fernandes et al. |
| 6,958,865 B1 | 10/2005 | Quake et al. |
| 6,960,437 B2 | 11/2005 | Enzelberger et al. |
| 6,964,736 B2 | 11/2005 | Quake et al. |
| 7,005,493 B2 | 2/2006 | Huang et al. |
| 7,038,856 B2 | 5/2006 | Quake et al. |
| 7,040,338 B2 | 5/2006 | Unger et al. |
| 7,042,649 B2 | 5/2006 | Quake et al. |
| 7,052,545 B2 | 5/2006 | Quake et al. |
| 7,059,348 B2 | 6/2006 | Nat |
| 7,062,418 B2 | 6/2006 | Lee et al. |
| 7,075,162 B2 | 7/2006 | Unger |
| 7,097,809 B2 | 8/2006 | Van Dam et al. |
| 7,118,910 B2 | 10/2006 | Unger et al. |
| 7,143,785 B2 | 12/2006 | Maerkl et al. |
| 7,144,616 B1 | 12/2006 | Unger et al. |
| 7,161,736 B2 | 1/2007 | Legrand et al. |
| 7,169,314 B2 | 1/2007 | Unger et al. |
| 7,192,629 B2 | 3/2007 | Lammertink et al. |
| 7,195,670 B2 | 3/2007 | Hansen et al. |
| 7,214,298 B2 | 5/2007 | Spence et al. |
| 7,216,671 B2 | 5/2007 | Unger et al. |
| 7,217,321 B2 | 5/2007 | Hansen et al. |
| 7,217,367 B2 | 5/2007 | Huang et al. |
| 7,232,109 B2 | 6/2007 | Driggs et al. |
| 7,244,402 B2 | 7/2007 | Hansen et al. |
| 7,248,413 B2 | 7/2007 | Quake et al. |
| 7,250,128 B2 | 7/2007 | Unger et al. |
| 7,258,774 B2 | 8/2007 | Chou et al. |
| 7,262,923 B2 | 8/2007 | Quake et al. |
| 7,279,146 B2 | 10/2007 | Nassef et al. |
| 7,291,512 B2 | 11/2007 | Unger |
| 7,294,503 B2 | 11/2007 | Quake et al. |
| 7,297,518 B2 | 11/2007 | Quake et al. |
| 7,306,672 B2 | 12/2007 | Hansen et al. |
| 7,307,802 B2 | 12/2007 | Unger |
| 7,312,085 B2 | 12/2007 | Chou et al. |
| 7,326,296 B2 | 2/2008 | Quake et al. |
| 7,351,376 B1 | 4/2008 | Quake et al. |
| 7,368,163 B2 | 5/2008 | Huang et al. |
| 7,378,280 B2 | 5/2008 | Quake et al. |
| 7,392,827 B2 | 7/2008 | Fernandes et al. |
| 7,407,799 B2 | 8/2008 | Balagadde et al. |
| 7,413,712 B2 | 8/2008 | Liu et al. |
| 7,442,556 B2 | 10/2008 | Manger et al. |
| 7,452,726 B2 | 11/2008 | Chou et al. |
| 7,459,022 B2 | 12/2008 | Hansen et al. |
| 7,476,363 B2 | 1/2009 | Unger et al. |
| 7,479,186 B2 | 1/2009 | Quake et al. |
| 7,494,555 B2 | 2/2009 | Unger et al. |
| 7,526,741 B2 | 4/2009 | Lee et al. |
| 7,583,853 B2 | 9/2009 | Taylor et al. |
| 7,588,672 B2 | 9/2009 | Unger et al. |
| 7,601,270 B1 | 10/2009 | Unger et al. |
| 7,604,965 B2 | 10/2009 | McBride et al. |
| 7,622,081 B2 | 11/2009 | Chou et al. |
| 7,640,947 B2 | 1/2010 | Fernandes et al. |
| 7,666,361 B2 | 2/2010 | McBride et al. |
| 7,670,471 B2 | 3/2010 | Quake et al. |
| 7,678,547 B2 | 3/2010 | Eyal et al. |
| 8,173,077 B2 | 5/2012 | Korampally et al. |
| 8,545,769 B2 | 10/2013 | Korampally et al. |
| 2001/0029983 A1 | 10/2001 | Unger et al. |
| 2001/0033796 A1 | 10/2001 | Unger et al. |
| 2001/0054778 A1 | 12/2001 | Unger et al. |
| 2002/0005354 A1 | 1/2002 | Spence et al. |
| 2002/0029814 A1 | 3/2002 | Unger et al. |
| 2002/0034027 A1 | 3/2002 | Legrand et al. |
| 2002/0034748 A1 | 3/2002 | Quake et al. |
| 2002/0037499 A1 | 3/2002 | Quake et al. |
| 2002/0053532 A1 | 5/2002 | Quake et al. |
| 2002/0058332 A1 | 5/2002 | Quake et al. |
| 2002/0108096 A1 | 8/2002 | Lee et al. |
| 2002/0108097 A1 | 8/2002 | Harris et al. |
| 2002/0109114 A1 | 8/2002 | Driggs et al. |
| 2002/0117517 A1 | 8/2002 | Unger et al. |
| 2002/0123033 A1 | 9/2002 | Eyal et al. |
| 2002/0127736 A1 | 9/2002 | Chou et al. |
| 2002/0144738 A1 | 10/2002 | Unger et al. |
| 2002/0145231 A1 | 10/2002 | Quake et al. |
| 2002/0158022 A1 | 10/2002 | Huang et al. |
| 2002/0160139 A1 | 10/2002 | Huang et al. |
| 2002/0164816 A1 | 11/2002 | Quake |
| 2002/0183996 A1 | 12/2002 | Lee et al. |
| 2002/0195152 A1 | 12/2002 | Fernandes et al. |
| 2003/0008308 A1 | 1/2003 | Enzelberger et al. |
| 2003/0008411 A1 | 1/2003 | Van Dam et al. |
| 2003/0019833 A1 | 1/2003 | Unger et al. |
| 2003/0061687 A1 | 4/2003 | Hansen et al. |
| 2003/0080442 A1 | 5/2003 | Unger |
| 2003/0096310 A1 | 5/2003 | Hansen et al. |
| 2003/0123155 A1 | 7/2003 | Quake et al. |
| 2003/0134129 A1 | 7/2003 | Lammertink et al. |
| 2003/0138829 A1 | 7/2003 | Unger et al. |
| 2004/0027707 A1 | 2/2004 | Legrand et al. |
| 2004/0072278 A1 | 4/2004 | Chou et al. |
| 2004/0112442 A1 | 6/2004 | Maerkl et al. |
| 2004/0115731 A1 | 6/2004 | Hansen et al. |
| 2004/0115838 A1 | 6/2004 | Quake et al. |
| 2004/0180377 A1 | 9/2004 | Manger et al. |
| 2004/0196569 A1 | 10/2004 | Quake et al. |
| 2004/0224380 A1 | 11/2004 | Chou et al. |
| 2004/0229349 A1 | 11/2004 | Daridon |
| 2004/0248167 A1 | 12/2004 | Chou et al. |
| 2005/0000900 A1 | 1/2005 | Huang et al. |
| 2005/0019213 A1 | 1/2005 | Kechagia et al. |
| 2005/0019792 A1 | 1/2005 | McBride et al. |
| 2005/0019794 A1 | 1/2005 | Nassef et al. |
| 2005/0022889 A1 | 2/2005 | Fernandes et al. |
| 2005/0036222 A1 | 2/2005 | Legrand et al. |
| 2005/0037471 A1 | 2/2005 | Liu et al. |
| 2005/0052754 A1 | 3/2005 | Quake et al. |
| 2005/0053952 A1 | 3/2005 | Hong et al. |
| 2005/0062196 A1 | 3/2005 | Hansen et al. |
| 2005/0065735 A1 | 3/2005 | Lee et al. |
| 2005/0072946 A1 | 4/2005 | Studer et al. |
| 2005/0084421 A1 | 4/2005 | Unger et al. |
| 2005/0112882 A1 | 5/2005 | Unger et al. |
| 2005/0118073 A1 | 6/2005 | Facer et al. |
| 2005/0123947 A1 | 6/2005 | Quake et al. |
| 2005/0129581 A1 | 6/2005 | McBride et al. |
| 2005/0145496 A1 | 7/2005 | Goodsaid et al. |
| 2005/0149304 A1 | 7/2005 | Harris et al. |
| 2005/0164376 A1 | 7/2005 | Balagadde et al. |
| 2005/0166980 A1 | 8/2005 | Unger et al. |
| 2005/0168828 A1 | 8/2005 | Quake et al. |
| 2005/0196785 A1 | 9/2005 | Quake et al. |
| 2005/0197652 A1 | 9/2005 | Nat |
| 2005/0201901 A1 | 9/2005 | Grossman et al. |
| 2005/0205005 A1 | 9/2005 | Hansen et al. |
| 2005/0214173 A1 | 9/2005 | Facer et al. |
| 2005/0221373 A1 | 10/2005 | Enzelberger et al. |
| 2005/0224351 A1 | 10/2005 | Unger et al. |
| 2005/0226742 A1 | 10/2005 | Unger et al. |
| 2005/0229839 A1 | 10/2005 | Quake et al. |
| 2005/0252773 A1 | 11/2005 | McBride et al. |

(56) References Cited

U.S. PATENT DOCUMENTS

| | | |
|---|---|---|
| 2005/0282175 A1 | 12/2005 | Taylor et al. |
| 2006/0000513 A1 | 1/2006 | Fernandes et al. |
| 2006/0006067 A1 | 1/2006 | Unger |
| 2006/0024751 A1 | 2/2006 | May et al. |
| 2006/0035273 A1 | 2/2006 | Quake et al. |
| 2006/0054228 A1 | 3/2006 | Unger et al. |
| 2006/0086309 A1 | 4/2006 | Manger et al. |
| 2006/0093836 A1 | 5/2006 | Huang et al. |
| 2006/0099116 A1 | 5/2006 | Manger et al. |
| 2006/0118895 A1 | 6/2006 | Unger |
| 2006/0171025 A1 | 8/2006 | Quake et al. |
| 2006/0172408 A1 | 8/2006 | Quake et al. |
| 2006/0196407 A1 | 9/2006 | Quake et al. |
| 2006/0196409 A1 | 9/2006 | Quake et al. |
| 2006/0281183 A1 | 12/2006 | Sun et al. |
| 2007/0004031 A1 | 1/2007 | Unger et al. |
| 2007/0004033 A1 | 1/2007 | Unger et al. |
| 2007/0054293 A1 | 3/2007 | Liu et al. |
| 2007/0059494 A1 | 3/2007 | Unger et al. |
| 2007/0074972 A1 | 4/2007 | Nassef et al. |
| 2007/0134807 A1 | 6/2007 | Bao et al. |
| 2007/0138076 A1 | 6/2007 | Daridon et al. |
| 2007/0141599 A1 | 6/2007 | Quake et al. |
| 2007/0172835 A1 | 7/2007 | McBride et al. |
| 2007/0196912 A1 | 8/2007 | Facer et al. |
| 2007/0209572 A1 | 9/2007 | Hansen et al. |
| 2007/0209574 A1 | 9/2007 | Hansen et al. |
| 2007/0224617 A1 | 9/2007 | Quake et al. |
| 2007/0248971 A1 | 10/2007 | Maerkl et al. |
| 2008/0029169 A1 | 2/2008 | Maerkl et al. |
| 2008/0050283 A1 | 2/2008 | Chou et al. |
| 2008/0075322 A1 | 3/2008 | Dube et al. |
| 2008/0075380 A1 | 3/2008 | Dube et al. |
| 2008/0088952 A1 | 4/2008 | Unger et al. |
| 2008/0108063 A1 | 5/2008 | Lucero et al. |
| 2008/0129736 A1 | 6/2008 | Sun et al. |
| 2008/0173365 A1 | 7/2008 | Unger et al. |
| 2008/0176211 A1 | 7/2008 | Spence et al. |
| 2008/0182273 A1 | 7/2008 | Hansen et al. |
| 2008/0210319 A1 | 9/2008 | Unger et al. |
| 2008/0210320 A1 | 9/2008 | Quake et al. |
| 2008/0210321 A1 | 9/2008 | Unger et al. |
| 2008/0210322 A1 | 9/2008 | Unger et al. |
| 2008/0220216 A1 | 9/2008 | Unger et al. |
| 2008/0223721 A1 | 9/2008 | Cohen et al. |
| 2008/0230387 A1 | 9/2008 | McBride et al. |
| 2008/0236669 A1 | 10/2008 | Unger et al. |
| 2008/0257437 A1 | 10/2008 | Fernandes et al. |
| 2008/0264863 A1 | 10/2008 | Quake et al. |
| 2008/0274493 A1 | 11/2008 | Quake et al. |
| 2008/0277005 A1 | 11/2008 | Unger et al. |
| 2008/0277007 A1 | 11/2008 | Unger et al. |
| 2008/0281090 A1 | 11/2008 | Lee et al. |
| 2008/0289710 A1 | 11/2008 | Unger et al. |
| 2008/0292504 A1 | 11/2008 | Goodsaid et al. |
| 2009/0018195 A1 | 1/2009 | Balagadde et al. |
| 2009/0035838 A1 | 2/2009 | Quake et al. |
| 2009/0061428 A1 | 3/2009 | McBride et al. |
| 2009/0069194 A1 | 3/2009 | Ramakrishnan |
| 2009/0087356 A1 | 4/2009 | Liu et al. |
| 2009/0142236 A1 | 6/2009 | Unger et al. |
| 2009/0147918 A1 | 6/2009 | Fowler et al. |
| 2009/0151422 A1 | 6/2009 | Unger et al. |
| 2009/0168066 A1 | 7/2009 | Hansen et al. |
| 2009/0176230 A1 | 7/2009 | McBride et al. |
| 2009/0187009 A1 | 7/2009 | May et al. |
| 2009/0239308 A1 | 9/2009 | Dube et al. |
| 2009/0257920 A1 | 10/2009 | Facer et al. |
| 2009/0291435 A1 | 11/2009 | Unger et al. |
| 2009/0294703 A1 | 12/2009 | Unger et al. |
| 2009/0299545 A1 | 12/2009 | Quan et al. |

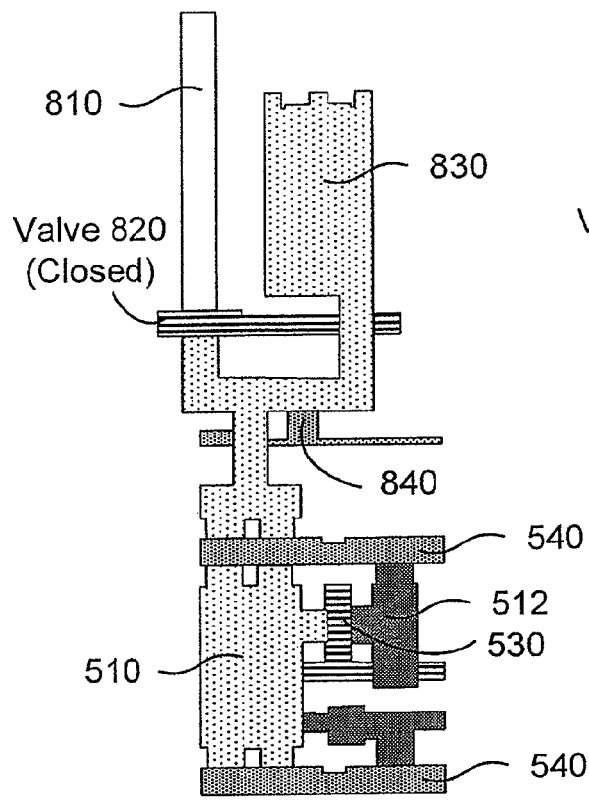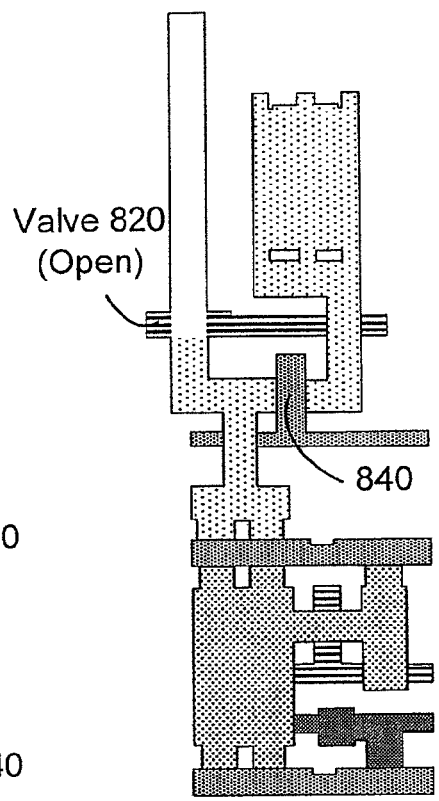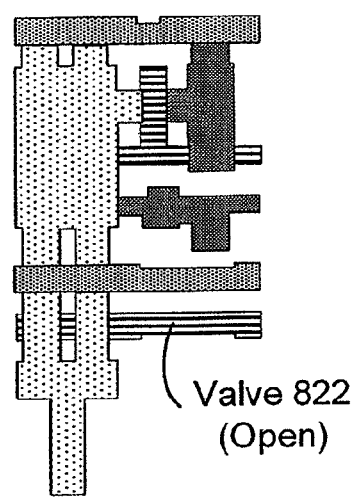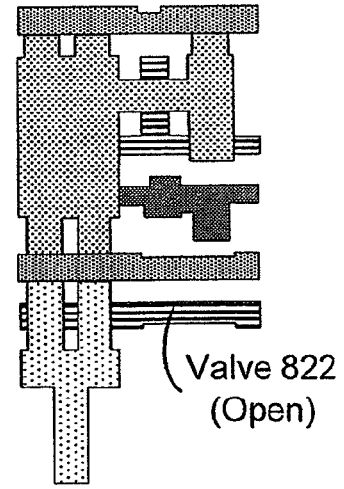
Fig. 3A
Fig. 3B

① Sample
② Harvest
③ NAIS
④ Rinse

| Chip ID     | 1st location  | 2nd location  |
|-------------|---------------|---------------|
| 1st PCR Cts | 22.2+/-0.34   | 22.4+/-0.27   |
| 2nd PCR Cts | 22.4+/-0.30   | 22.3+/-0.34   |
| 3rd PCR Cts | 22.6+/-0.18   | 22.3+/-0.22   |
| 4th PCR Cts | 22.4+/-0.21   | 22.4+/-0.20   |
| 5th PCR Cts | 22.3+/-0.22   | 22.5+/-0.33   |
| 6th PCR Cts | 22.7+/-0.22   | 22.4+/-0.23   |

Fig.4

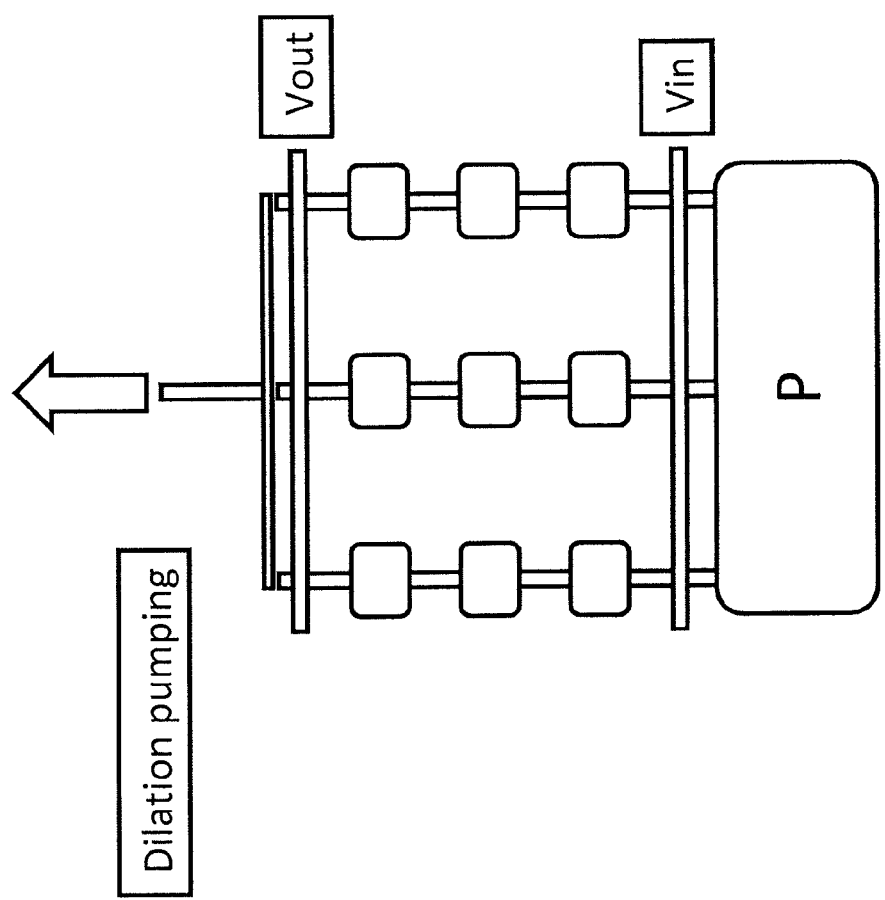

MICROFLUIDIC DEVICE REGENERATION

CROSS-REFERENCE TO RELATED APPLICATIONS

This application claims priority to U.S. provisional patent application No. 61/265,325, filed Nov. 30, 2009, which is incorporated by reference herein in its entirely.

BACKGROUND OF THE INVENTION

Microfluidic devices have revolutionized the field of nucleic acid analysis, particularly analyses involving nucleic acid amplification. Appropriately designed devices can be used as analytical tools to determine whether a particular target nucleic acid of interest is present or absent in a sample, to detect or characterize alleles correlated with diseases or genetic disorders, to conduct genotyping analyses and gene expression analyses, for nucleic acid sequencing and other uses. In one embodiment, the devices can be used in a preparative fashion to amplify sufficient nucleic acid for further analysis.

Reductions in the costs of analysis could be achieved by designing reusable microfluidic devices, particularly reusable elastomer-based microfluidic devices. However, there are several barriers to reusing such devices. One limitation relates to the sensitivity of nucleic acid analyses, in which a single nucleic acid molecule can be detected. Thus, even a tiny amount of contamination from a previous round of analysis can render a reused device unreliable.

BRIEF DESCRIPTION OF THE DRAWINGS

FIGS. 3A-D show simplified schematic diagrams illustrating fluid flow through a microfluidic device during operation according to an embodiment of the present invention.

FIG. 4 shows results of an experiment in which six sequential PCR amplifications were carried out in each of two devices, with regeneration of the devices between amplifications. In each reaction, the microfluidic devices were loaded with both positive and negative controls as described in the Example, infra. Real time PCR heat maps were obtained to assess the reliability of the device after regeneration. The Cts and standard deviation of Cts are shown Results for first chip are shown in the second column and the results for the second chip are shown in the third column.

FIG. 10A-D illustrate methods for uniform meter pumping. FIG. 10A: Dilation Pumping; FIG. 10B: Single Sided Dilation Pumping; FIG. 10CB: Peristaltic Pumping; FIG. 10D: Limiting Resistor pumping.

Figure 1:
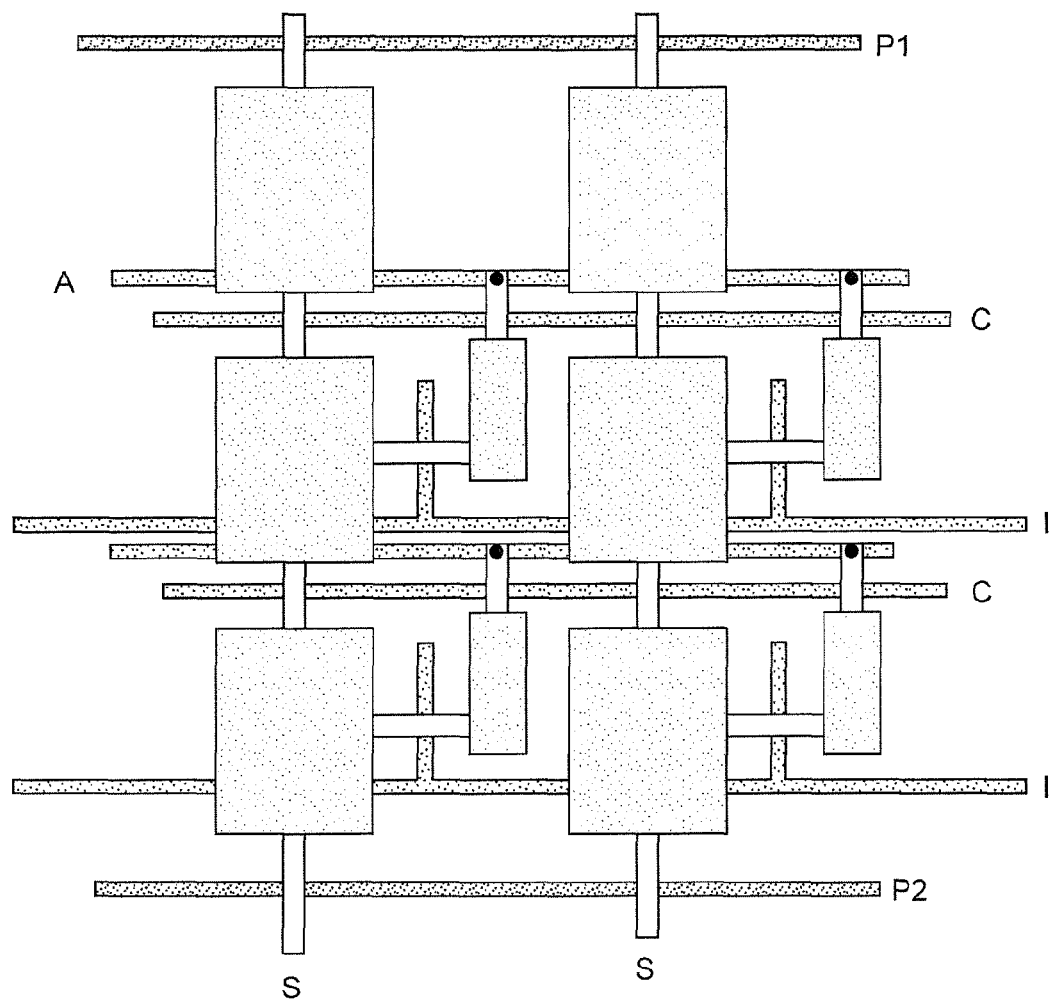
FIG. 1 is a schematic drawing showing selected chambers, channels and valves of a reusable microfluidic chip.

These diagrams are merely representative and not intended to limit the scope of the present invention. It will be appreciated that the exemplary fluidic circuits as shown in the drawings do not necessarily include all the valves that will be used in a working device. Depending on the specific configuration selected a working device may use fewer valves than illustrated.

BRIEF SUMMARY OF THE INVENTION

In one aspect the invention provides a method for rendering a microfluidic device suitable for reuse for nucleic acid analysis, said method by a) flowing a nucleic acid inactivating solution into a microfluidic channel of the device by pumping; and then b) flowing a wash solution into the channel by pumping, thereby displacing the nucleic acid inactivating solution from the channel, whereby any residual nucleic acid from a prior use of the device is inactivated. In one embodiment the microfluidic device comprises a plurality of microfluidic reaction chambers each fluidically linked to said microfluidic channel. In one embodiment the microfluidic reaction chambers comprise residual nucleic acid from a prior use of the microfluidic device.

In one embodiment the invention provides a method for removing residual nucleic acid from an elastomeric microfluidic device by a) flowing a nucleic acid inactivating solution into a microfluidic space wherein said microfluidic space comprises i) a first microfluidic channel, ii) a plurality of microfluidic reaction chambers, arranged in series along, and each fluidically linked to, said channel, wherein the nucleic acid inactivating solution is introduced into said microfluidic space under pressure and under conditions sufficient for deformation of elastomeric portions of the channel and chambers, and b) flowing the nucleic acid inactivating solution through the microfluidic space, and removing the nucleic acid inactivating solution from the microfluidic space, by pumping. In one embodiment the microfluidic space comprises a plurality of first microfluidic channels each fluidically linked to a plurality of microfluidic reaction chambers. The pumping in some embodiments comprises a first process and/or a second process, wherein the first process comprises: i) flowing the nucleic acid inactivating solution from an first nucleic acid inactivating solution source through the first microfluidic channel into at least a one microfluidic reaction chamber, wherein the nucleic acid inactivating solution is introduced into said microfluidic space under pressure and under conditions sufficient for deformation of elastomeric portions of the chamber; and then, ii) closing one or more first input valves to isolate the inactivating solution source from the at least one microfluidic reaction chamber; and then, iii) opening one or more first output valves to allow fluid to flow out of the microfluidic space; and wherein the second process comprises: i) flowing the nucleic acid inactivating solution from a second nucleic acid inactivating solution source through a plurality of interface channels into said plurality of microfluidic reaction chambers, wherein the nucleic acid inactivating solution is introduced into said microfluidic space under pressure and under conditions sufficient for deformation of elastomeric portions of the chambers; and then, ii) closing one or more valves to isolate the inactivating solution source from the plurality of interface channels; wherein the valves are interface valves or second input valves, and then, iii) opening one or more second output valves, which may be the same or different from the first output valve(s), to allow fluid to flow out of the microfluidic space; wherein the second nucleic acid inactivating solution source may be the same or different from the first nucleic acid inactivating solution source. In some embodiments, in the second process, each interface channel links a single microfluidic reaction chamber to a single microfluidic reaction chamber, each interface channel has an interface valve associated therewith for controlling fluid communication between the single reaction chamber and the single reagent chamber, and each reaction chamber is fluid communication with the second nucleic acid inactivating solution source when said one or more second input valves are open. In some embodiments the first process comprises flowing the nucleic acid inactivating solution from a first nucleic acid inactivating solution source through the first microfluidic channel into at least a one microfluidic reaction chamber via a slug channel; and the second process comprises flowing the nucleic acid inactivating solution from a second nucleic acid inactivating solution source through a plurality of interface channels into said plurality of microfluidic reaction chambers via a slug channel. In some embodiments pumping comprises only the first process, which is repeated at least once, or pumping comprises only the second process, which is repeated at least once, or pumping comprises both the first process and the second process, wherein each process may be repeated and wherein the processes are carried out according to a predetermined pattern.

In some embodiments the method further comprises removing the nucleic acid inactivating solution by: a) flowing a wash solution into the microfluidic space following the path(s) by which the nucleic acid inactivating solution was flowed into the microfluidic space, b) flowing the wash solution through the microfluidic space, by pumping, and c) removing the nucleic acid inactivating solution from the microfluidic space.

In some embodiments the method further comprising removing the nucleic acid inactivating solution by: a) flowing a wash solution into the microfluidic space following at least one path different from the path by which the nucleic acid inactivating solution was flowed into the microfluidic space, b) flowing the wash solution through the microfluidic space, by pumping, and c) removing the nucleic acid inactivating solution from the microfluidic space.

In some embodiments the method comprises removing the nucleic acid inactivating solution by flowing a wash solution through the microfluidic space, wherein a) if the nucleic acid inactivating solution was introduced according to the first process, the wash solution is flowed through the device by a third process comprising: i) flowing the wash solution from a wash solution source into said first microfluidic channel and into at least one microfluidic reaction chamber, wherein the wash solution is introduced into said microfluidic space under conditions and pressure sufficient for deformation of elastomeric portions of the channel and chambers, and then, ii) closing one or more third input valves to isolate said microfluidic space from the wash solution source; and then, iii) opening a one or more third output valves, which may be the same or different from the first output valve(s), to allow fluid to flow out of the microfluidic space; and b) if the nucleic acid inactivating solution was introduced according to the second process, the wash solution is flowed through the device by a fourth process comprising i) flowing the wash solution from a wash solution source through said plurality of interface channels into at least one microfluidic reagent chamber or at least one microfluidic reaction chamber, wherein the wash solution is introduced into said microfluidic space under conditions and pressure sufficient for deformation of elastomeric portions of the channels and chambers, and then, ii) closing one or more fourth input valves, which may be the same or different from the first input valve(s), to isolate the wash solution source from the microfluidic space; or closing the interface valves, thereby isolate the wash solution source from the microfluidic space; and then, iii) opening one or more fourth output valves, which may be the same or different from the first output valve(s), to allow fluid to flow out of the microfluidic space.

DETAILED DESCRIPTION OF SPECIFIC EMBODIMENTS

The invention provides a method for removing residual nucleic acid from an elastomeric microfluidic device.

The term "microfluidic device" has its usual meaning in the art and refers to a device containing microfluidic channels (e.g., channel with at least one cross-sectional dimension less than 500 microns) through which liquids can flow, and valves that, when closed, can obstruct flow of liquid through a channel. A "microfluidic device" may also contain chambers with a volumes less than or equal to 100 nl (e.g., less than or equal to 40 nl, less than or equal to 10 nl, or less than or equal to 2 nl).

An "elastomeric microfluidic device" is a microfluidic device with at least one microfluidic component, such as a layer or a wall of a channel or chamber fabricated using an elastomer. In some embodiments most or substantially all of the material that defines channels and chambers of the device are comprised of elastomeric material. Exemplary elastomeric microfluidic devices and methods of manufacture are described, infra, and the references cited herein below. In some embodiments, the elastomer is polydimethylsiloxane (PDMS).

The use of elastomeric microfluidic devices for nucleic acid analysis is well known in the art. Examples of nucleic acid analysis include, without limitation, PCR amplification, isothermic amplification, hybridization, reverse transcription, nucleic acid sequencing, and other reactions in which nucleic acids may be introduced into the device, or modified or generated in the device (e.g., generation of PCR amplicons). Introduction of cells containing DNA and RNA into a device is an example of introducing nucleic acids. After one round of nucleic acid analysis, any residual nucleic acid molecules remaining in the device must be removed prior to a subsequent use to avoid perturbation of the subsequent analysis.

As used herein, "residual nucleic acid" refers to those nucleic acid molecules in a multiuse device that must be removed prior to carrying out nucleic acid analysis using the device. Residual nucleic acid may be any kind of nucleic acid molecules including, e.g., single or double stranded RNA or DNA, primers, probes, amplicons, genomic DNA, recombinant DNA and the like.

As used herein, the term "removing residual nucleic acid" means that, following treatment, no contaminating nucleic acids are detected in the microfluidic device. In one embodiment no contaminating nucleic acids are detected when an amplification reaction (e.g., PCR) is carried out in the device using primers known to amplify nucleic acids introduced or generated during a preceding round of analysis. See, e.g., Example, infra. Without intending to be bound by a particular mechanism, removing residual nucleic acid may involve degrading nucleic acids (e.g., by hydrolysis) and physically transferring nucleic acid molecules or fragments or derivatives out of the device. A nucleic acid is inactivated when it is unable to function as a primer, probe or template in a nucleic acid reaction such as a polymerase chain reaction.

Inactivation of a residual nucleic acid can be accomplished by contacting the residual nucleic acid with a nucleic acid inactivating solution. Examples of nucleic acid inactivating solutions include acid solutions (e.g., <pH 4), and solutions containing oxidizers (e.g., hydrogen peroxide), enzymes (e.g., DNAase) and the like. A preferred nucleic acid inactivating solution is bleach (sodium hypochlorite). Another example of nucleic acid inactivating solutions are solutions containing psoralen. Another example of a nucleic acid inactivating solutions is sodium hydroxide solution (e.g., >pH 10). Combinations of two or more than two of the aforementioned agents may be used in combination, or sequentially.

In one embodiment, the method of the invention involves flowing a nucleic acid inactivating solution into a microfluidic space in which nucleic acids have been generated or introduced in a preceding round of analysis or earlier use of the device.

A "microfluidic space" refers to a channel or network of channels (including vias), and optionally chambers, with the following characteristics:
  i) the space is topologically continuous in the sense that a liquid solution can flow or be pumped from one region of the microfluidic space to any other region; and
  ii) by closing two or more valves, the space can be topologically isolated, in the sense that a liquid solution in the space cannot flow out of the microfluidic space.

A microfluidic space of the present invention will have at least one input and one separate output. It will be recognized that "microfluidic space" is a functional definition. That is, provided with a specific microfluidic device having multiple channels and valves, it may be possible to identify one, two, or several, potential "microfluidic spaces."

In certain embodiments the microfluidic space comprises (i) a first microfluidic channel and (ii) a plurality of microfluidic reaction chambers, arranged in series along, and each fluidically linked to, said channel. Examples of such configurations, for illustration and not limitation, include "slug channel-type" devices (see U.S. Pat. Pub. 2008/0223721, incorporated herein by reference); "dynamic array-type" devices (see U.S. Pat. No. 7,476,363, incorporated herein by reference; also see U.S. Pat. Pub. 20090257920 describing "Multilevel Microfluidic Systems and Methods, incorporated herein by reference); and "blind-flow-type" devices (see U.S. Pat. No. 7,476,363, incorporated herein by reference, e.g., FIG. 3); and others. Such microfluidic systems known in the art may be modified so that each first channel (as described herein below) is fluidically linked to an input and a separate output, and to add input and output valves to the system to facilitate dilation pumping. One suitable system is described in commonly owned copending application PCT/US10/29854, published as WO 2010/115154 (and claiming priority to U.S. Pat. App. No. 61/166,105, "Microfluidic Device with Reaction Product Recovery System"), incorporated herein by reference. A microfluidic device that can be used to practice aspects of the intention, the "Access Array Integrated Fluidic Circuit," is available from Fluidigm Corp., S. San Francisco, Calif. In some embodiments other methods for uniform metered pumping are used.

Figure 8:
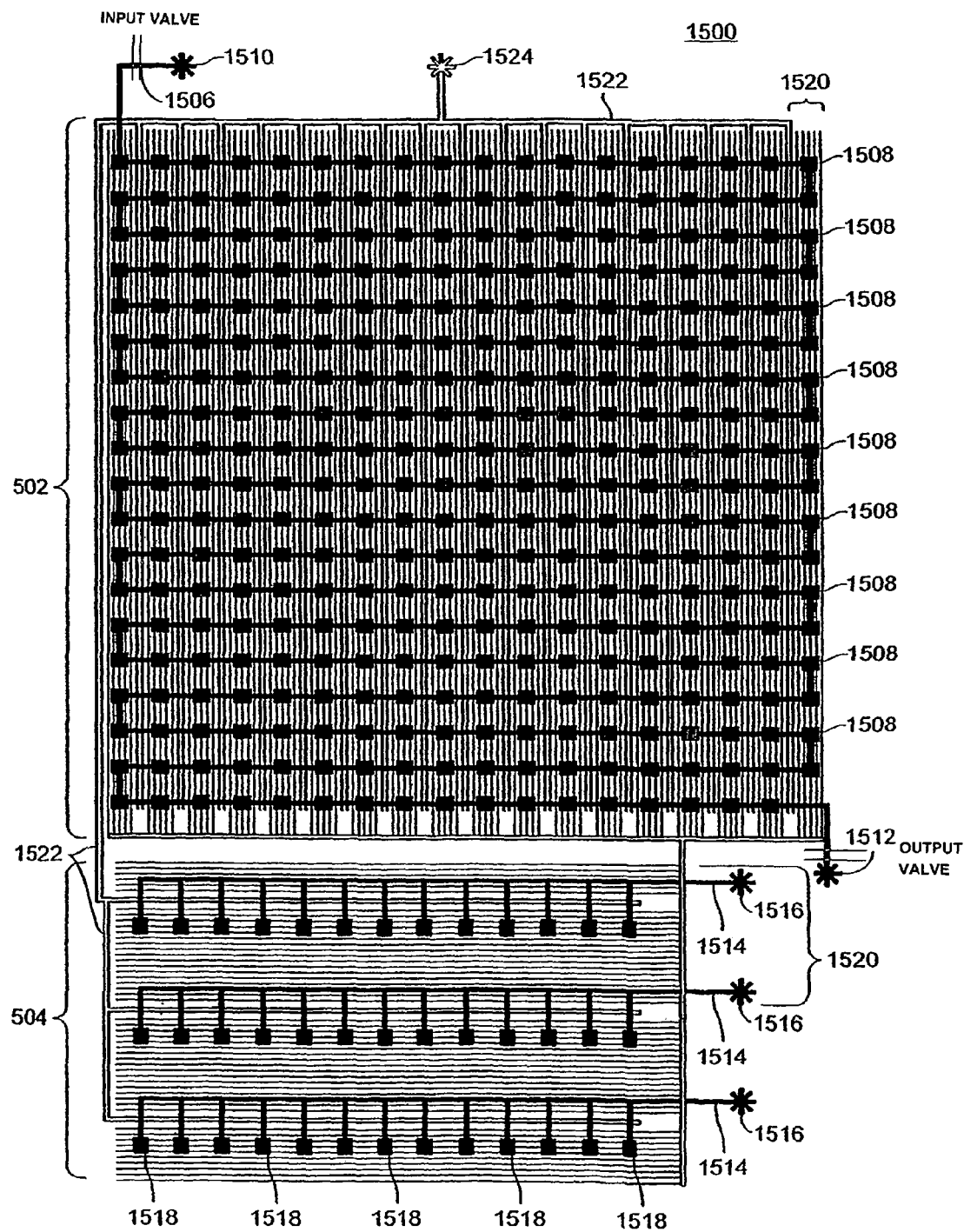
FIG. 8 is a schematic drawing modified from U.S. Pat. No. 7,476,363, showing selected chambers, channels and valves of a reusable microfluidic chip.

An example of a structurally simple device that can be regenerated is a device containing a channel in fluidic communication with a first fluid input and a first fluid output, a plurality of valves capable of partitioning the channel in a manner suitable for digital PCR (see U.S. Pat. No. 7,604,965, incorporated herein by reference), and a pair of valves (i.e., an input valve and an output valve) at the termini. See FIG. 8.

Figure 5:
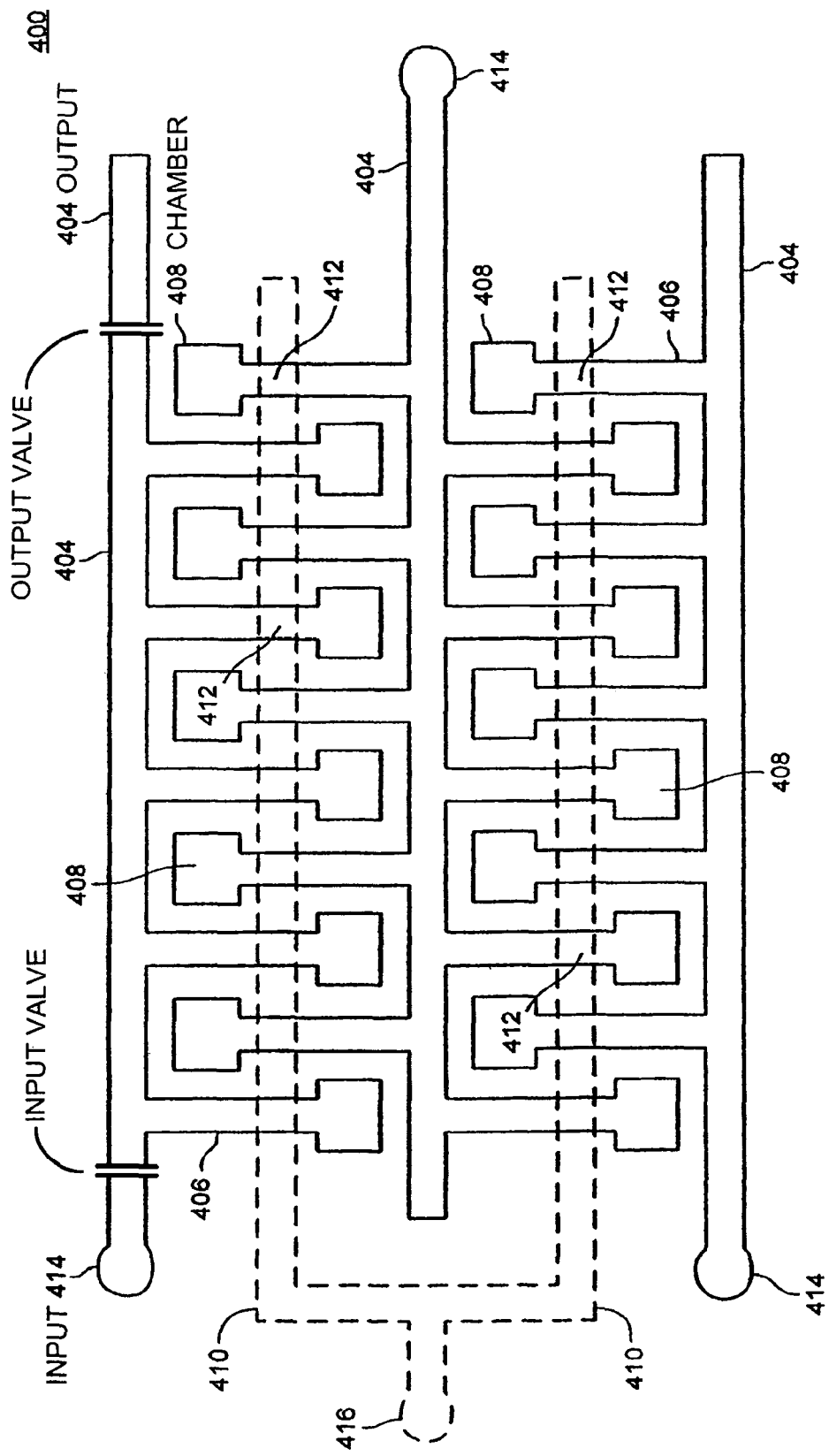
FIG. 5 is a schematic drawing modified from U.S. Pat. No. 7,476,363, showing selected chambers, channels and valves of a reusable microfluidic chip.

Importantly, the invention is not limited to devices in which a plurality of microfluidic reaction chambers are arranged in series along one microfluidic channel. Rather the methods of the invention can be carried out, for example, in microfluidic devices comprising a plurality of channels, in which uniform meter pumping can be carried out. Typical devices comprise a plurality of independent channels (each comprising a plurality of chambers or fluidically linked to a plurality of chambers (see, e.g., FIG. 5, showing channels 404 fludically linked through channels 406 to chambers 412). In exemplary devices there may be about 12, about 24, about 48, about 96, about 192 or more channels. In some embodiments, each channel is independently directly linked to a common source of nucleic acid inactivation (NAI) solution. "Uniform meter pumping" refers to methods that achieve uniform flow through many microfluidic channels and is required for proper operation of the method. Because small deviations in channel dimensions, bubbles, or variations in surface energy can create a situation where only some channels (e.g., less than half) carry all or most of the flow through a fluidic network comprising a plurality of channels, methods for uniform meter pumping are needed to ensure uniform flow of inactivation solution and wash solution through all parts of the fluidic network, resulting in essentially complete inactivation of residual nucleic acids. Methods for uniform meter pumping include "dilation pumping," "single ended dilation pumping", "peristaltic pumping" and "limiting resistor."

"Dilation pumping" is a method of operating a properly configured integrated fluidic circuit (microfluidic device) to obtain precise, low rate, low volume pumping through all, or a selected subset of, elements of the microfluidic device. Dilation pumping is unique to microfluidic circuits that utilize channels that have one or more channel walls formed from an elastomeric material. Dilation pumping can be conceptualized by imaging a simple fluidic circuit consisting of:
  1. A microfluidic channel with at least one channel wall formed from an elastomeric material and having an input at one end of the channel in fluidic communication with a solution source.
  2. An output at the other end of the channel.
  3. A plurality of microfluidic reaction chambers, arranged in series along, and each fluidically linked to, the microfluidic channel and positioned between the input and output.
  4. An input valve between the input and the plurality of microfluidic reaction chambers.
  5. An output valve between the plurality of microfluidic reaction chambers and the output.

Figure 10B:
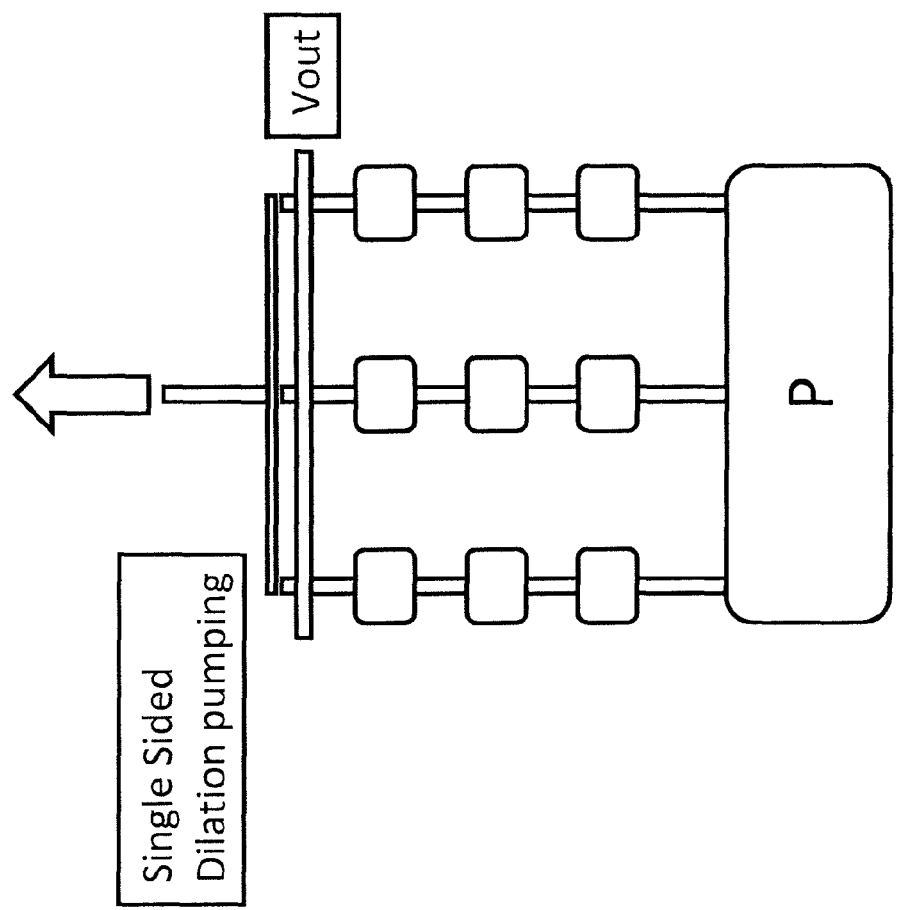

To carry out dilation pumping in this simple fluidic circuit according to the present invention, the channel is initially filled with solution between the input and output. Initially the solution may be, without limitation, a reaction solution from a prior round of nucleic acid analysis, a harvest solution, or any other solution. Pumping proceeds with the output valve closed and the input valve open. Valves 822 and 820 of FIG. 3A-D illustrate this. A nucleic acid inactivating solution is introduced into the channel through the input valve. Because the channel is filled with solution and because there is no separate exit through which liquid can flow, introduction of the nucleic acid inactivating solution will result in deformation or expansion of the elastomeric walls of the channel. In some embodiments all the walls (inner surfaces) of the channel are elastomeric. The pressurization of microfluidic channels with at least one channel wall formed from an elastomeric material results in expansion of the elastomeric wall(s) outward from the channel with a resulting increase in channel volume that is proportional to the fluidic pressure within the channel, the elastic properties of the elastomeric channel wall material such as Young's modulus, and the length and cross sectional area of the channel. The nucleic acid inactivating solution must be introduced under sufficient pressure to cause such deformation or expansion. Methods for introducing solution under pressure are known and include, for example, use of a pump. Suitable pumps can be, without limitation, electronic, electrostatic, magnetic, mechanical, syringe, pneumatic, or peristaltic (see, e.g., U.S. Pat. No. 6,408,878, incorporated herein by reference). Following introduction of the nucleic acid inactivating solution the input valve is closed and then the output valve is opened. As the channel walls return to their normal (unpressurized) volume solution is forced out through the output valve. This cycle can be repeated any number of times, until the channel is entirely filled with nucleic acid inactivating solution, if desired. It will be appreciated that, in addition to a nucleic acid inactivating solution, other solutions can be transported by dilation pumping. For example, nucleic acid inactivating solution may be displaced from the microfluidic channel by a wash solution. Dilation pumping is illustrated schematically in FIG. 10A. A valve at the input to the network $V_{in}$ and one at the output $V_{out}$ allow the flow to be metered and pressure to be applied to the network.

Figure 10C:
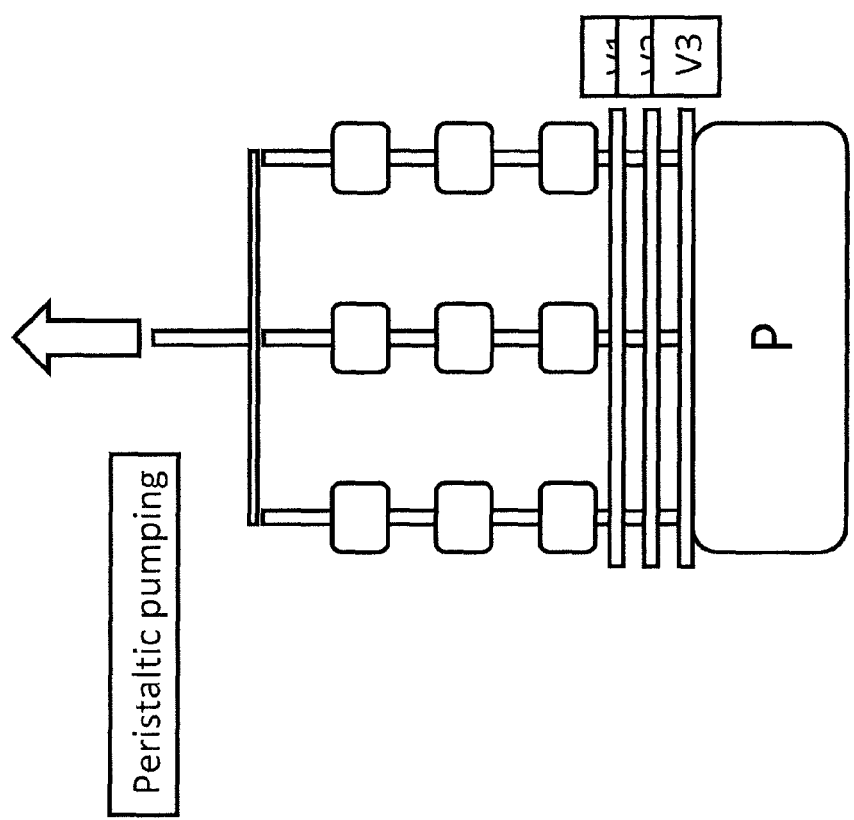
Figure 10D:
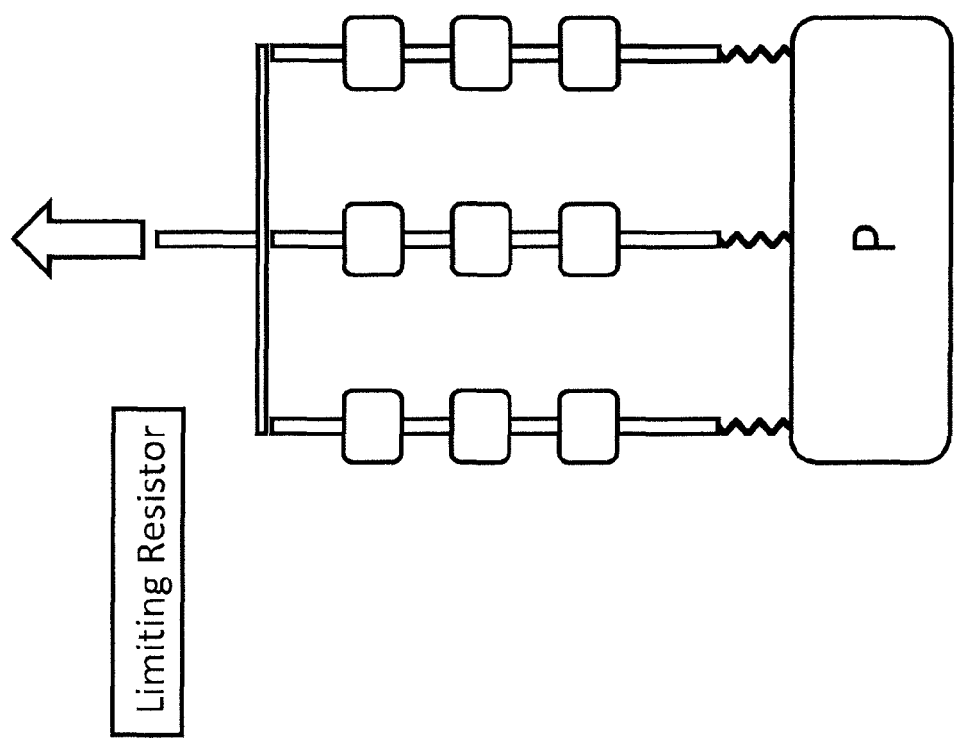

Other methods of uniform meter pumping are Single Sided Dilation Pumping, Peristaltic Pumping and Limiting Resistor pumping. In Single Sided Dilation Pumping (FIG. 10B) only the $V_{out}$ is used. The pressure is allowed to build up in and expand the network. $V_{out}$ is opened briefly to allow each of the channels to flow. In Peristaltic Pumping (FIG. 10C) a series of three valves are used in a sequence where two of the three valves are always closed in the sequence (e.g., 1,3; 2,3; 1,2). This method works both with and without a pressurized solution source. In Limiting Resistor pumping (FIG. 10D), an identical flow restriction is placed in each of the channels, creating resistance that is much larger than the variation in resistance over all the channels in the network. Methods for restricting flow are known in the art. Dilation Pumping and Single Sided Dilation Pumping are generally carried out in devices with flow channels formed at least partially from an elastomeric material. Peristaltic Pumping and Limiting Resistor pumping may be carried out in wholly nonelastomeric materials.

FIG. 10A-D show the pressurized solution source (P) directly connected to three flow channels. It will be appreciated that typically the solution source is in fluidic communication with a larger number of flow channels. In the case of dilation pumping and single ended dilation pumping, it is also possible to use a distribution manifold to distribute solution from a single channel connected to the solution source to multiple flow channels. In some embodiments the channels are parallel along at least a portion of their length.

As used herein, the terms "input" or "output" refer to channels that carry a solution from a solution source (e.g., reservoir) into a microfluidic space, or carry a solution contained in a microfluidic space out from the microfluidic space. Although used for clarity, the terms "input" and "output" do not necessarily connote limited function or structure. For example, notwithstanding the terminology, a solution may flow through an "output" into a microfluidic space, and flow through an "input" out from the space. Similarly, adjectives modifying elements such as valves (e.g., input valve vs. output valve) and chambers (e.g., reagent chamber vs. reaction chamber) are used only for clarity and are not intended to limit the function of the element.

Figure 9:
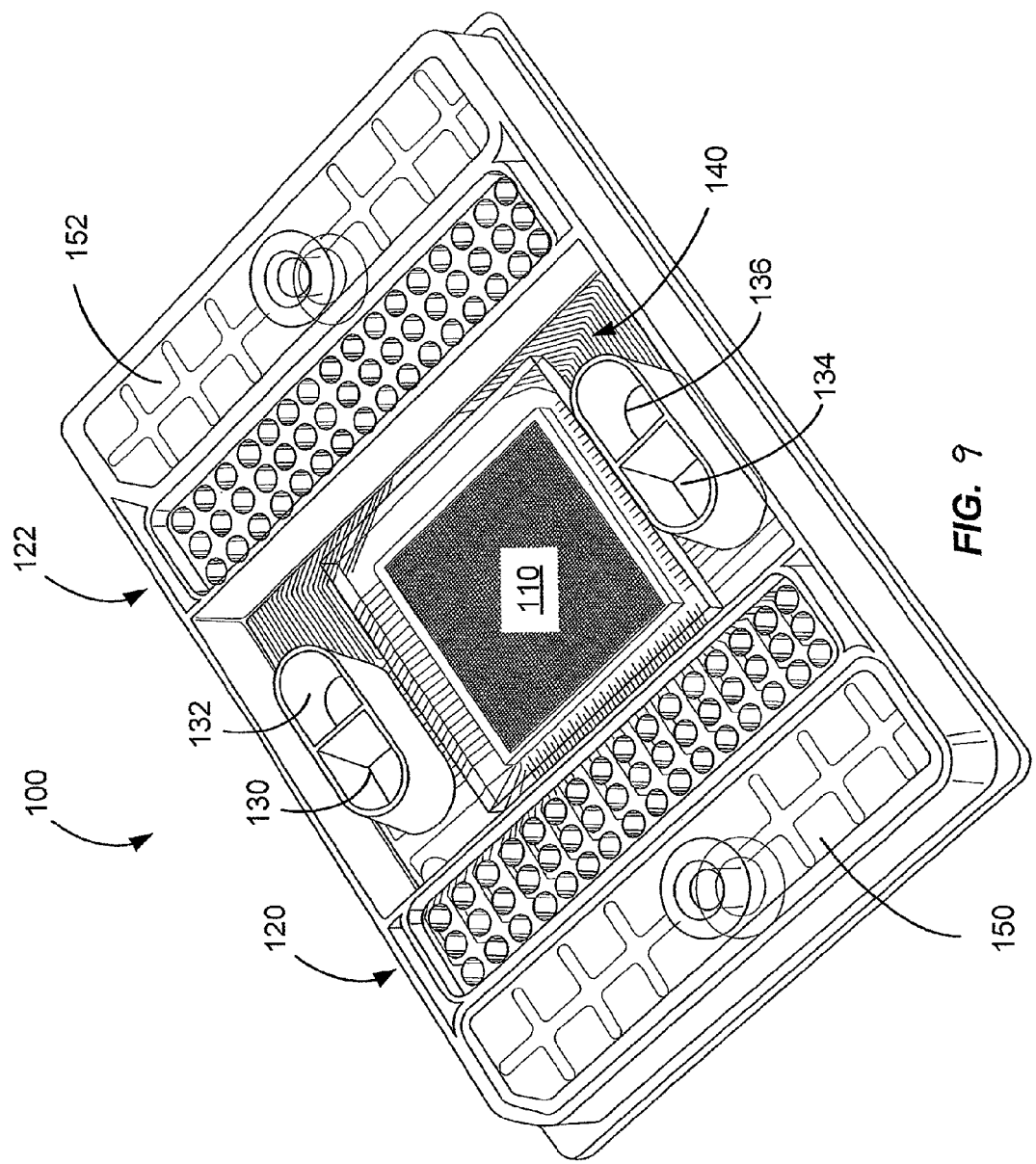
FIG. 9 is a simplified perspective illustration of a carrier and a microfluidic device according to an embodiment of the present invention.

The nucleic acid inactivating solution and other solutions (e.g., a wash solution) may be introduced from a "solution source," such as a nucleic acid inactivating solution source, a rinse solution source, and the like. In some embodiments the solution source can be integral to the microfluidic device carrier. An illustration of such a device is provided in FIG. 9, a simplified perspective illustration of a carrier and a microfluidic device according to an embodiment of the present invention. The carrier 100 supports a microfluidic device 110. The carrier 100 may be made from materials providing suitable mechanical support for the various elements of the carrier. As an example, the carrier is made using a plastic or other suitable material. The outer portion of the carrier has the same footprint as a standard 384-well microplate and enables stand-alone valve operation. Additionally, the carrier 100 may be compatible with conventional stand-alone thermal cyclers. In the illustrated embodiments, there are 48 sample input ports 120 located on a first side of the carrier 100 and 48 assay reagent input ports 122 located on an opposing side of the carrier. The banks of sample input ports 120 and assay input ports 122 are recessed with respect to the top of the carrier. Utilizing these recessed features, pressure can be applied concurrently to all of the sample input ports or the assay input ports, driving fluids present in the respective ports through fluid lines 140 connecting the input ports and either vias, fluid input lines, or combinations thereof, present on the microfluidic device 110.

The carrier 100 also includes four sources 130, 132, 134, and 136. One or more of the four sources may be used as fluid wells, containing liquids such as nucleic acid inactivation solution, wash solution, harvesting reagent, etc. Pressure can be applied to, for example, source 130, forcing the solution to flow through fluid lines provided on the carrier to fluid lines provided on the microfluidic device. An alternative use of one or more of the four sources shown in FIG. 9 would be to actuate control lines (e.g., pressurize control lines operable to open and close valves) present in the microfluidic device.

After the nucleic acid inactivating solution is injected under pressure, resulting in expansion of the elastomeric wall(s) outward from the channel and/or chambers of the device, is the input valve is closed. Following closure of the input valve, the output valves is opened and fluid in the channel is allowed to flow out of the channel past the output valve. In any pump cycle, the pumped volume through the microfluidic channel and chambers is equal to the expanded volume of the channel and chambers when under pressure minus the native volume of the channel and chambers when pressure is released and the expanded elastomeric wall(s) are allow to relax.

As discussed above, a nucleic acid inactivating solution, wash solution, or other solution for uniform metered pumping (e.g., dilation pumping), is introduced into the microfluidic space. In one embodiment the solution is introduced under conditions sufficient for deformation of elastomeric portions of the channels. As will be apparent from the discussion above, "conditions sufficient for deformation of elastomeric portions" means a solution (e.g., the nucleic acid inactivating solution) is introduced into the microfluidic space under pressure and under conditions in which there is no separate exit through which fluid can flow out of the microfluidic space (that is, any exit routes are blocked by closed valves) and the solution (e.g., nucleic acid inactivating solution) is introduced under pressure.

Figure 6:
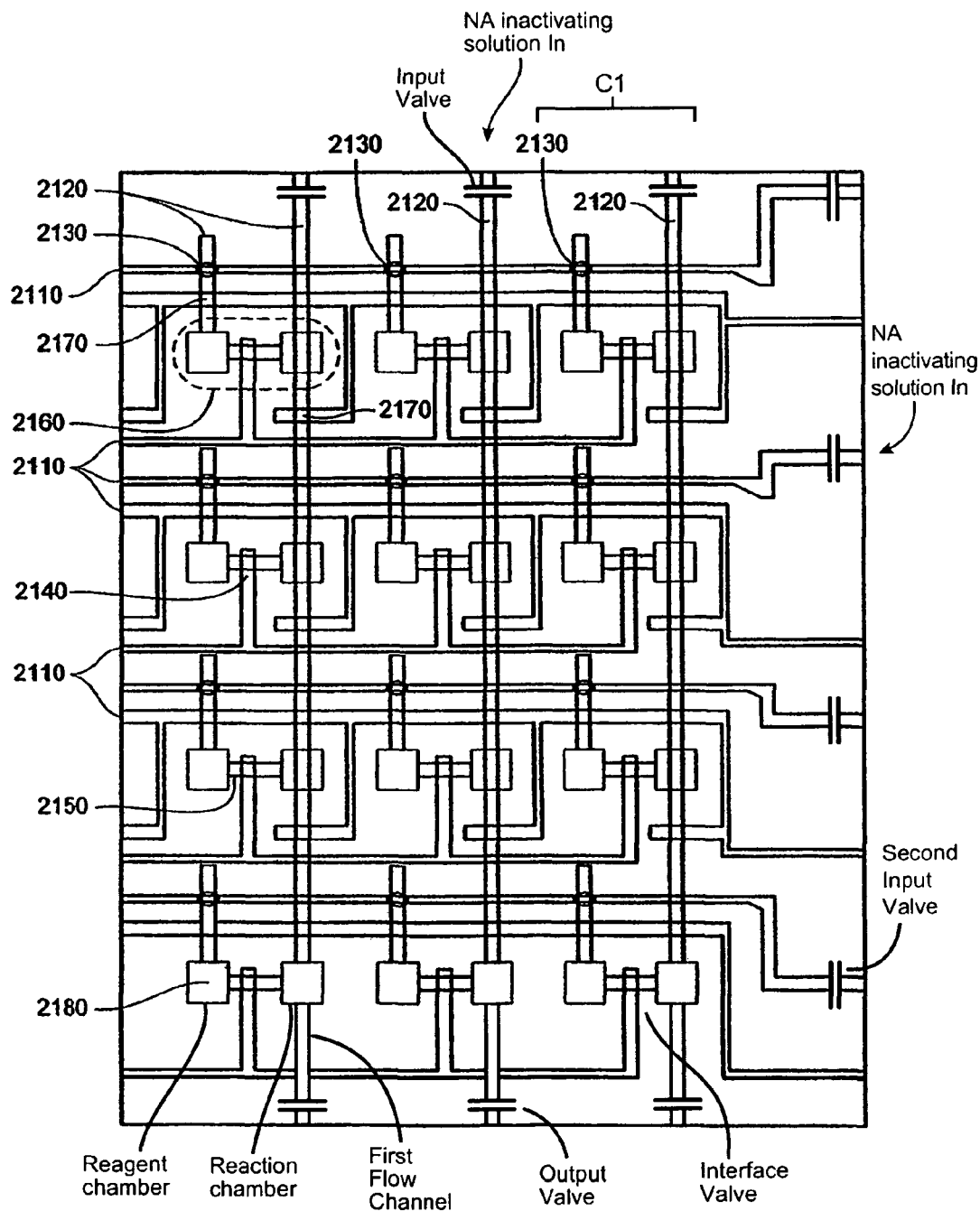
FIG. 6 is a schematic drawing modified from U.S. Pat. No. 7,476,363, showing selected chambers, channels and valves of a reusable microfluidic chip.
Figure 7:
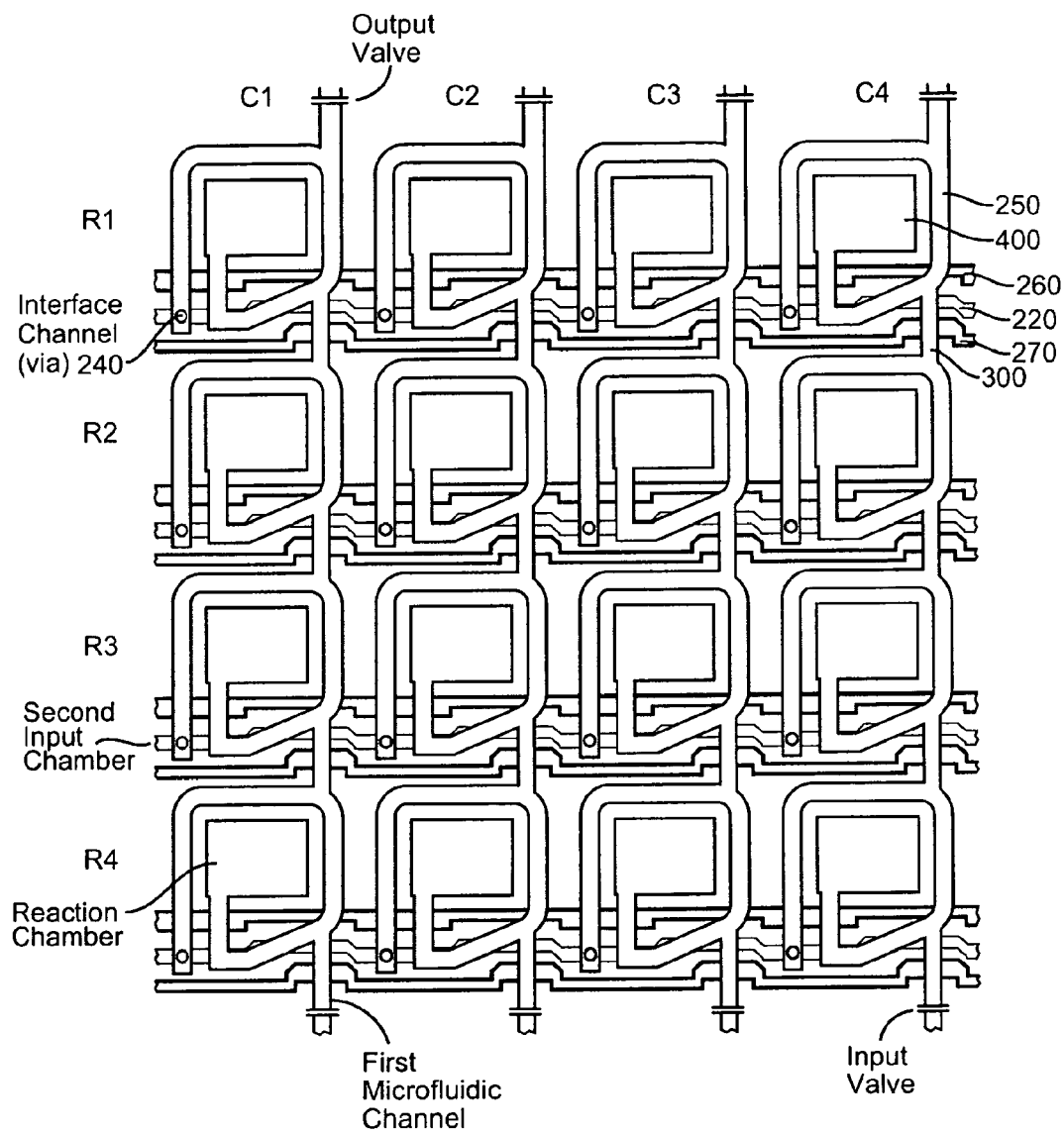
FIG. 7 is a schematic drawing modified from U.S. Pat. Pub. 2008/0223721, showing selected chambers, channels and valves of a reusable microfluidic chip.

In some embodiments, microfluidic devices used in the practice of the invention comprise an array of multiple columns and multiple rows of microfluidic chambers or unit cells (pairs of chambers) in which the chambers or unit cells in each column are fluidically linked to one microfluidic channel and the chambers or unit cells in each row are fluidically linked to a second one microfluidic channel (see FIGS. 1, 6 and 7). The array is configured so that each chamber or unit cell is linked to a unique pair of a row (M) and column (N). This architecture enables analysis of M×N different pairs of, for example, reagents and samples. See, e.g., U.S. Pat. Pub. 2008/00223721 and U.S. Pat. No. 7,476,363, both incorporated by reference herein. In the discussion and figures presented here, only a small portion of the array is shown or discussed. For purposes of clarity, often only a single column, or portion of a column, of the microfluidic device is discussed.

As will be apparent, the present method can be carried out in microfluidic devices having complex designs, with numerous interconnected channels, branch points (e.g., from a first microfluidic channel to a microfluidic chamber; see, e.g., FIGS. 5-7) and tortuous flow paths from input to output.

Following removal of residual nucleic acids using the nucleic acid inactivating solution it is generally desirable to remove the nucleic acid inactivating solution from the microfluidic space. This may be accomplished, for example, by flowing a wash solution into the microfluidic space using the pumping (e.g., dilation pumping) process. Suitable wash solutions include water, saline solution, aqueous buffer (e.g., Tris buffer), detergent solutions, and the like. Exemplary detergent solutions, for illustration and not limitation, include 0.1% to 10% v/v TWEEN 80, TRITON X-100, NPR40 and NONIDET P40. The result of a sufficient number of cycles of pumping is that wash solution (e.g., sterile water) is flowed through the entire microfluidic space and displaces any nucleic acid inactivating solution from the microfluidic space. The wash solution may be flowed through the microfluidic space following the path(s) by which the nucleic acid inactivating solution was flowed through the microfluidic space. Alternatively, the wash solution may be flowed through the microfluidic space following the path(s) that differ from those by which the nucleic acid inactivating solution was flowed through the microfluidic space.

Wash solutions can be removed by drying, optionally by exposing the device to an elevated temperature.

Exemplary System Architectures

The present invention may be practiced with a variety of system architectures. Notably, additional and different process steps may be incorporated in embodiments using other circuit architectures. It will be appreciated that the following examples are for illustration and not for limitation.

In one embodiment the device comprises (i) a first microfluidic channel; (ii) a plurality of microfluidic reaction chambers, arranged in series along, and each fluidically linked to, said channel. See, e.g., FIGS. 5 and 8, both of which are modified from U.S. Pat. No. 7,476,363, which provides additional description of the figures.

In one embodiment the device comprises (i) a first microfluidic channel; (ii) a plurality of microfluidic reaction chambers, arranged in series along, and each fluidically linked to, said channel; and (iii) a plurality of interface channels. In this embodiment each microfluidic reaction chamber is fluidically linked to an interface channel so that fluid may flow from the chamber into either the first microfluidic channel or the interface channel (as well as in the reverse direction). In some embodiments, a plurality of interface channels are commonly linked to a second microfluidic channel, as discussed above, to provide an array of unique reaction sites. For an illustration of such a system architecture see, e.g., FIG. 7, which is modified from U.S. Pat. Pub. US 2008/00223721 (in which can be found additional description of the figure). Also see U.S. Pat. No. 7,476,363, incorporated by reference.

In some embodiments, each microfluidic reaction chamber is fluidically linked to an interface channel as above, and each interface channel is fluidically linked to a reagent chamber. In some embodiments, as mentioned above, each of a plurality of reagent chambers may be linked to a common second microfluidic channel. Optionally each interface channel is associated with an interface valve for controlling fluid communication between a single reaction chamber and a single reagent chamber. See FIGS. 1, 6 and 10. FIG. 6 is modified from U.S. Pat. No. 7,476,363, in which additional description of the figure can be found. FIG. 3 is modified from WO 2010/115154 and provisional application No. 61/166,105, incorporated by reference, in which additional description of the figure can be found.

It will be apparent that, although the basic processes of the invention are not dependent on a specific device architecture, the specific processes will vary somewhat depending on the device. For example, in a device in which each microfluidic reaction chamber is fluidically linked to an interface channel, each interface channel is fluidically linked to a reagent chamber, and reagent chambers are linked to a common second microfluidic channel, nucleic acid inactivating solution and/or wash solution can be introduced into reaction chambers from the first microfluidic flow channel, and/or can be introduced through an interface channel. The latter approach is useful to remove residual nucleic acids (or other contaminants) from both the reagent chamber and the reaction chamber.

FIG. 3

FIG. 3, which is modified from WO 2010/115154 and provisional application No. 61/166,105, incorporated herein for all purposes, shows portions of an "Access Array-type" device. FIG. 3 provides four simplified schematic diagrams illustrating fluid flow through a microfluidic device during operation according to an embodiment of the present invention.

FIG. 3A illustrates a portion of a microfluidic device according to an embodiment of the present invention during loading of samples and assays. The illustrated portion includes an input line 810 and loading bowl portions 830, and isolation valve 840. Valves 820 and 822 are used to perform dilation pumping of reaction products present in sample chambers 510. Input line 810 may be used for a variety of solutions during the course of an assay and regeneration of a chip such as, for example, a sample or reagent solution, a harvest solution, a nucleic acid inactivation solution and a wash solution. As illustrated in FIG. 3A, valve 820 is closed and valve 822 is open. Valves 820 and 822 are typically "push-up" valves.

Samples are loaded into sample chambers 510 and assays are loaded into assay chambers 512. Interface valves 530 are closed, preventing mixing of the samples and assays. Loading bowls are provided in some embodiments to allow for reductions in effects related to depletion fronts. (In loading samples into microfluidic devices, e.g., through the vertical sample input lines illustrated in FIG. 3A, binding of a portion of the sample present at the leading edge of the flow path to the material of the microfluidic device will produce a depletion front in which one or more components of the sample are depleted as a result of this binding process. The provision of loading bowls 830 enables the user to push the depletion front through the various sample chambers of the microfluidic device and store the depleted sample material in the loading bowls 830. Eventually, as the depleted sample material is flushed through the device into the loading bowls, the sample contained in the microfluidic device will be substantially undepleted.)

Isolation valve 840 is open during the sample and assay loading process to enable the depletion front to flow into the loading bowls 830. Valve 822 is open, allowing the samples to flow through the sample input lines to the various sample chambers. Since valve 820 is closed, samples are not allowed to pass into the input line 810. It should be noted that containment valves 540 are illustrated in the closed state in FIG. 3A. Containment valves are open during sample and assay loading and then are closed as illustrated after sample and assay loading is complete. The containment valves isolate the various pairs of reaction and assay chambers from other pairs containing the various pairwise combinations.

In FIG. 3A, only a single column of the microfluidic device is illustrated for purposes of clarity. It is understood that additional columns are provided by the microfluidic devices as illustrated, for example, in FIGS. 1, 6 and 7. Moreover, much of the column is not illustrated for the purposes of clarity.

FIG. 3B illustrates mixing of the samples and assays and a subsequent reaction (e.g., amplification) process. In order to mix the samples and reagents, interface valves 530 are placed in the open position as shown. Closure of containment valves 540 seals the reaction products in the sample and assay chambers along with the connecting fluid lines. As illustrated in FIG. 3B, isolation valve 840 is closed, preventing fluid flow between the sample input lines and the loading bowls 830. Actuation of valve 840 to place it in the open or closed position is performed using a pressure accumulator (see FIG. 9) in some embodiments and using other actuation techniques in other embodiments, for example, mechanical, electrostatic, electromechanical, thermodynamic, piezoelectric, or the like.

Although FIG. 3B illustrates mixing and reaction using a single image, one of skill in the art will appreciate that multiple thermal cycles may be used to amplify DNA using the PCR process. Thus, this simple figure is intended to show mixing and subsequent reactions that can occur in the microfluidic device.

Figure 3C:
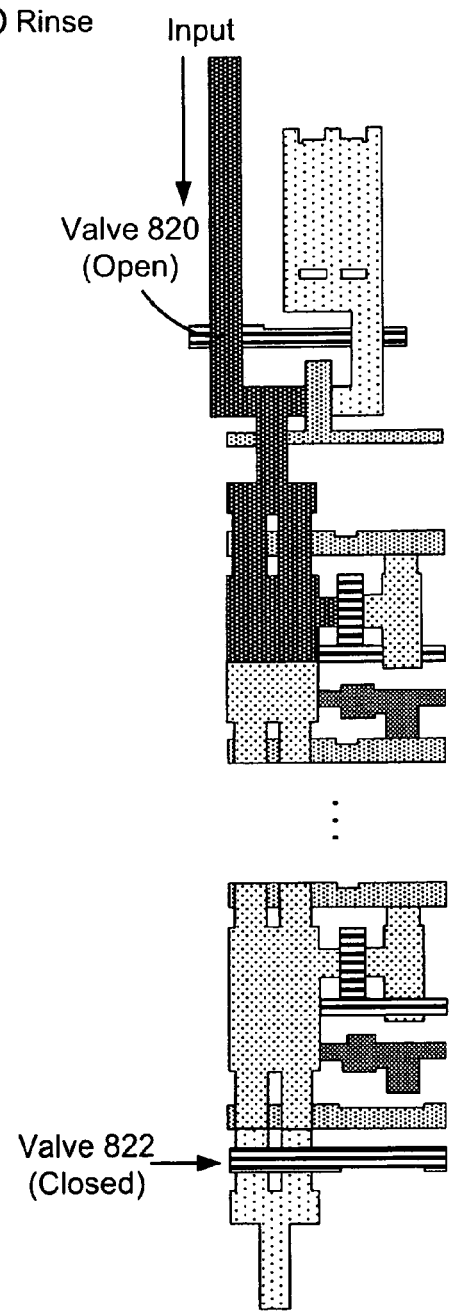

FIG. 3C illustrates a portion of the microfluidic device in a first stage of the removal of residual nucleic acids. A nucleic acid inactivating solution flows from an input through an input line 810 toward the reaction chambers. As shown in FIG. 3A, valve 820 is open, allowing the nucleic acid inactivating solution to flow into the topmost sample chamber. Closure of the interface valves 530 prevents the nucleic acid inactivating solution from flowing into the reagent chambers, which also contain reaction products. The extent to which the nucleic acid inactivating solution initially fills the input lines and reaction chambers is limited by the closure of valve 822. As illustrated, the nucleic acid inactivating has only partially filled a portion of the first sample chamber. The illustration of a side of the sample chamber being filled with nucleic acid inactivating is merely provided by way of example, since the flow of the nucleic acid inactivating into the sample chamber is actually through vias extending from the plane of the figure. Closure of isolation valve 840 prevents nucleic acid inactivating from flowing into the loading bowls, although other embodiments may enable such a flow if desired.

Fluid pressure resulting from the flow of the nucleic acid inactivating into the array portion of the microfluidic device results in expansion of the sample input lines and sample chambers above the valve 822. The dilation pump cycle is initiated by this pressurization of the sample chambers. As described below, closing of valve 820 and opening of valve 822 will enable solution (e.g., nucleic acid inactivating) to be recovered from the microfluidic device as it flows through the microfluidic device.

Figure 3D:
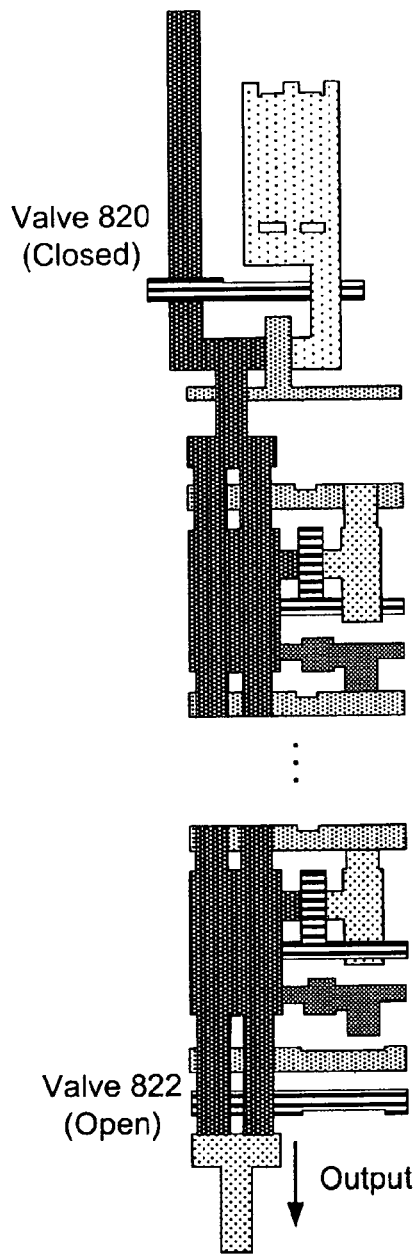

FIG. 3D illustrates a portion of the microfluidic device in a second stage of the process. Although a second stage is illustrated, this is not intended to imply that the second stage immediately follows the first stage. The second stage is typically separated from the first stage by one or more intermediate stages of dilation pumping.

As is discussed above, dilation pumping (also know as volumetric capacitive pumping) is a method of operating a properly configured integrated fluidic circuit (microfluidic device) to obtain precise, low rate, low volume pumping through all configured elements of the microfluidic device. Dilation pumping is unique to microfluidic circuits that utilize channels that have one or more channel walls formed from an elastomeric material. As an example, the flow of the harvesting reagent through the sample input lines and sample chambers is considered volumetric capacitive pumping. Pumping proceeds by the closure of valves 822 and the opening of valves 820. As discussed above, harvesting reagent ports (not illustrated) are pressurized to introduce the harvesting reagent into the topmost sample input lines and sample chambers, which can be considered as a channel. The pressurization of microfluidic channels with at least one channel wall formed from an elastomeric material results in expansion of the elastomeric wall(s) outward from the channel with a resulting increase in channel volume that is proportional to the fluidic pressure (or gaseous pressure in alternate embodiments) within the channel, the elastic properties of the elastomeric channel wall material such as Young's modulus, and the length and cross sectional area of the channel. The sample input lines and sample chambers are allowed to pressurize and then valves 820 is closed as illustrated in FIG. 3D. Following closure of valves 820, valves 822 are opened. The pumped volume through the sample input lines and the sample chambers is equal to the expanded volume of the channel when under pressure minus the native volume of the channel when pressure is released and the expanded elastomeric channel wall(s) is allow to relax. Dilation pumping is continued through repetitive cycles of closing 822, opening 820, pressurizing the sample input lines and sample chambers, closing 820, and opening 822. In this manner, continuous or discontinuous low volume pumping may be accomplished at precisely controlled flow rates.

Thus embodiments provide a method of dilation pumping that includes closing a first valve disposed between the reaction chambers and the input (i.e., valve 822), opening a second valve disposed between the output and the reaction chambers (i.e., valve 820), closing the second valve, opening the first valve, and repeating these steps a predetermined number of times. Between the steps of opening the second valve and closing the second valve, the NAIS flows into the sample input lines and sample chambers, pressurizing the channel as described above.

The fluid flow rate (e.g., into or out of the microfluidic space) in dilation pumping is slow. In some embodiments less than 90 µl/hr, 80 µl/hr, 70 µl/hr, 60 µl/hr, 50 µl/hr, 40 µl/hr, 30 µl/hr, 20 µl/hr, 10 µl/hr, 9 µl/hr, less than 8 µl/hr, less than 7 µl/hr, less than 6 µl/hr, less than 5 µl/hr, less than 4 µl/hr, less than 3 µl/hr, less than 2 µl/hr, less than 1 µl/hr, or less than 0.5 µl/hr.

FIG. 7

In another related embodiment, each microfluidic reaction chamber is fluidically linked to an interface channel as above through a "slug channel." See U.S. Pat. Pub. 2008/0223721, incorporated herein by reference. In this embodiment, the interface channel traverse layers of the microfluidic device and is also referred to as a "via." See FIG. 7 (additional description of which may be found in U.S. Pat. Pub. 2008/

0223721). The "vertical vias" or interconnects between the elastomer layers can be made by created by lithographically patterning an etch resistant layer on top of a elastomer layer, then etching the elastomer and finally removing the etch resist before adding the last layer of elastomer or by laser punching. FIG. 1

In another related embodiment, solutions (nucleic acid inactivating solution and/or wash solutions) are flowed through the channels and chambers of the microfluidic device by either or both of two paths, illustrated in FIG. 1. In the first path, nucleic acid inactivating solution is loaded into chip and was pressurized into sample bus line (S in the FIG. 1) with P1 valves closed and P2 valves open. The P2 valves are then closed. The solution is then released when P1 is opened and P2 remained closed. In the second path, both the reaction chambers and reagent chambers are cleaned by dilation pumping using valves I and P1 and introducing solution through the assay line (A in FIG. 1). In this approach, valves P2 and P1 are closed and solution from the assay line is pressurized. The solution could pass from assay lines through reagent-reaction chambers and went out of the chip by closing the valves of I (interface valves) and opening P1. Thus, by selecting a pattern of opening and closing valves of P1, P2 and I, the dilation pumping mode could be sample side only, assay side only, one cycle sample side push followed by one cycle assay side push, 5-cycle sample side pushes followed by 2-cycle assay side pushes, etc. The optimal combination can be adjusted according to the chamber volume ratio or other parameters. In some embodiments the nucleic acid inactivating solution is circulated using the first path and the wash solution is circulated using both paths, for example.

In one aspect, the invention provides a method for rendering a microfluidic device suitable for reuse for nucleic acid analysis by (a) flowing a nucleic acid inactivating solution into a microfluidic channel of the device by dilation pumping; and then (b) flowing a wash solution into the channel by dilation pumping, thereby displacing the nucleic acid inactivating solution from the channel, whereby any residual nucleic acid from a prior use of the device is inactivated. In some embodiments, the microfluidic device comprises a plurality of microfluidic reaction chambers each fluidically linked to said microfluidic channel. In some embodiments, the microfluidic reaction chambers comprise residual nucleic acid from a prior use of the microfluidic device. In some embodiments, the nucleic acid inactivating solution and the wash solution are introduced into the channel by different flow paths. In some embodiments, either the nucleic acid inactivating solution or the wash solution or both are introduced into the channel at multiple points spaced along the channel. In some embodiments, the either the nucleic acid inactivating solution or the wash solution or both flow from microfluidic reaction chambers into multiple points of the channel.

In a related aspect, the invention provides a method for removing residual nucleic acid from an elastomeric microfluidic device by (a) flowing a nucleic acid inactivating solution into a microfluidic space, where the microfluidic space comprises a first microfluidic channel, and where the nucleic acid inactivating solution is introduced into the microfluidic space under pressure and under conditions sufficient for deformation of elastomeric portions of the channel and chambers, and then (b) flowing the nucleic acid inactivating solution through the microfluidic space, and removing the nucleic acid inactivating solution from the microfluidic space, by dilation pumping.

In some embodiments, the invention provides a method for removing residual nucleic acid from an elastomeric microfluidic device by (a) flowing a nucleic acid inactivating solution into a microfluidic space where the microfluidic space comprises i) a first microfluidic channel, and ii) a plurality of microfluidic reaction chambers, arranged in series along, and each fluidically linked to, said channel, and the nucleic acid inactivating solution is introduced into the microfluidic space under conditions sufficient for deformation of elastomeric portions of the channel and chambers, and then (b) flowing the nucleic acid inactivating solution through the microfluidic space, and removing the nucleic acid inactivating solution from the microfluidic space, by dilation pumping.

In some embodiments the microfluidic space comprises a plurality of first microfluidic channels each fluidically linked to a plurality of microfluidic reaction chambers.

The process of dilation pumping can involve, for example, a first process or a second process or both. In one embodiment, the first process comprises (i) flowing the nucleic acid inactivating solution from an inactivating solution source through the first microfluidic channel into at least a one microfluidic reaction chamber; and then, (ii) closing one or more first input valves to isolate the inactivating solution source from the at least one microfluidic reaction chamber; and then, (iii) opening one or more first output valves to allow fluid to flow out of the microfluidic space. In one embodiment, the second process comprises (i) flowing the nucleic acid inactivating solution from an inactivating solution source through a plurality of interface channels into said plurality of microfluidic reaction chambers; and then, (ii) closing one or more second input valves to isolate the inactivating solution source from the plurality of interface channels and/or closing one or more interface valves; and then, (iii) opening one or more second output valves, which may be the same or different from the first output valve(s), to allow fluid to flow out of the microfluidic space.

In another embodiment, the second process is varied so that the process of dilation pumping comprises (i) flowing the nucleic acid inactivating solution from an inactivating solution source through a plurality of interface channels into said plurality of microfluidic reaction chambers; and then, (ii) closing interface valves to isolate the inactivating solution source from the reaction chambers; and then, (iii) opening one or more second output valves, which may be the same or different from the first output valve(s), to allow fluid to flow out of the microfluidic space. Generally the second output valves are the same as the first output valves in the first microfluidic channel.

When the device comprises interface channels, in some embodiments each interface channel links a single microfluidic reaction chamber to a single microfluidic reaction chamber, each interface channel has an interface valve associated therewith for controlling fluid communication between the single reaction chamber and the single reagent chamber, and each reaction chamber is fluid communication with the inactivating solution source when said one or more second input valves are open.

In another embodiment, the process of dilation pumping can involves flowing the nucleic acid inactivating solution from an inactivating solution source through the first microfluidic channel into at least a one microfluidic reaction chamber by way of a slug channel; and/or flowing the nucleic acid inactivating solution from an inactivating solution source through a plurality of interface channels into said plurality of microfluidic reaction chambers by way of a slug channel.

It will be apparent that the flow of the nucleic acid inactivating solution (NAIS) can be through either or both of two basic paths. In the first, the NAIS is introduced from a nucleic acid inactivating solution source into the first microfluidic channel and into a first reaction chamber (e.g., the reaction chamber in each row or column closest to the input). In the second, the NAIS is introduced from a second nucleic acid inactivating solution source (which may be the same or different than the first) into a plurality of interface channels (or into a plurality of reagent chambers and then into a plurality of interface channels) and then into a plurality of reaction chambers along the first microfluidic channel. Thus, one path removes residual nucleic acids from the reaction channels using dilation pumping, and the second removes residual nucleic acids from both reaction chambers and reagent chambers (in devices containing both reagent chambers) using dilation pumping.

In various embodiments, the dilation pumping comprises only the first process, which is repeated at least once (i.e., the first path), or comprises only the second process, which is repeated at least once (i.e., the second path), or comprises both the first process and the second process, wherein each process may be repeated and wherein the processes are carried out according to a predetermined pattern.

In an additional aspect of the invention, the NAIS that is introduced into the microfluidic space is removed (washed out) by flowing a was solution through the microfluidic space using dilation pumping. In some embodiments the wash solution is flowed though the same path or series of paths the NAIS was flowed through. In some embodiments the wash solution is flowed though a different path or series of paths than the NAIS. For example, the NAIS may be flowed using only the first process and the wash solution is flowed using both the first process and the second process Thus, in one aspect the invention further comprises removing the nucleic acid inactivating solution by (a) flowing a wash solution into the microfluidic space following the path(s) by which the nucleic acid inactivating solution was flowed into the microfluidic space, (b) flowing the wash solution through the microfluidic space, by dilation pumping, and (c) removing the nucleic acid inactivating solution from the microfluidic space. Alternatively, in one aspect the invention further comprises removing the nucleic acid inactivating solution by (a) flowing a wash solution into the microfluidic space following at least one path different from the path by which the nucleic acid inactivating solution was flowed into the microfluidic space; (b) flowing the wash solution through the microfluidic space, by dilation pumping, and (c) removing the nucleic acid inactivating solution from the microfluidic space.

In some embodiments, the method comprising removing the nucleic acid inactivating solution by flowing a wash solution through the microfluidic space, where if the nucleic acid inactivating solution was introduced according to the first process, the wash solution is flowed through the device by a third process comprising: (i) flowing the wash solution from a wash solution source into said first microfluidic channel and into at least one microfluidic reaction chamber, wherein the wash solution is introduced into said microfluidic space under conditions and pressure sufficient for deformation of elastomeric portions of the channel and chambers, and then, (ii) closing one or more third input valves to isolate said microfluidic space from the wash solution source; and then, (iii) opening a one or more third output valves, which may be the same or different from the first output valve(s), to allow fluid to flow out of the microfluidic space. Alternatively, if the nucleic acid inactivating solution was introduced according to the second process, the wash solution is flowed through the device by a fourth process comprising (i) flowing the wash solution from a wash solution source through said plurality of interface channels into at least one microfluidic reagent chamber or at least one microfluidic reaction chamber, wherein the wash solution is introduced into said microfluidic space under conditions and pressure sufficient for deformation of elastomeric portions of the channels and chambers, and then, (ii) closing one or more fourth input valves, which may be the same or different from the first input valve(s), to isolate the wash solution source from the microfluidic space; or closing the interface valves, thereby isolate the wash solution source from the microfluidic space; and then, and then, (iii) opening one or more fourth output valves, which may be the same or different from the first output valve(s), to allow fluid to flow out of the microfluidic space.

Fidelity

Surprisingly, as described in the Examples, by using the methods described herein, a device may be used for multiple independent analysis cycles (where a cycle comprises an amplification reaction, detection of product, and regeneration of the device) without carry-over of nucleic acids (e.g., DNA). Thus, the device can be reused multiple times without producing false positives (due to contamination) or other inaccurate results.

Using the methods of the invention, several cycles e.g., at least 2, at least 3, at least 4, 5 or more than 5 rounds) of amplification reactions can be carried out without an increase in false positives. For example, in one cycle, an amplification reaction carried out in a chamber of a microfluidic device, the device is treated according to the invention ("regenerated"), and a second amplification reaction is carried out in the same chamber. The device is again regenerated and a third reaction is carried out, and so forth.

The remarkable fidelity achieved using this method is illustrated in the Examples, and can be tested in any device by carrying out an amplification reaction in a chamber of a microfluidic device, regenerating the device according to the invention, and repeating the amplification reaction in the chamber in the absence of template DNA under conditions in which any contaminating DNA, if present, would result in a signal. Using the methods of the invention, the signal in the absence of template DNA is essentially undetectable through several amplification-regeneration cycles (e.g., at least 2, at least 3, at least 4, 5 or more than 5 cycles). In this context, a residual signal that is less than 2% of the signal (more often less than 1%, (and often less than 0.1% and of the signal of the positive control (signal in the presence of template DNA) may be considered undetectable. An exemplary assay can be carried out using human genomic DNA (60 ng/ul), GAPDH-specific primers (e.g., Forward 5'GGACCTGACCTGC-CGTCTAG3'; Reverse 5'TAGCCCAGGATGCCCTTG-AG3'), Taq polymerase, and 30-40 thermocycles.

Manufacture of Elastomeric Microfluidic Devices

As noted above, microfluidic devices of the invention are, at least partially, fabricated using elastomeric materials. Fabrication methods using elastomeric materials will only be briefly described here, because elastomeric materials, methods of fabrication of devices made using such materials, and methods for design of devices and their components have been described in detail (see, e.g., Unger et al., 2000, Science 288:113-16; U.S. Pat. No. 6,960,437 (Nucleic acid amplification utilizing microfluidic devices); U.S. Pat. No. 6,899, 137 (Microfabricated elastomeric valve and pump systems); U.S. Pat. No. 6,767,706 (Integrated active flux microfluidic devices and methods); U.S. Pat. No. 6,752,922 (Microfluidic chromatography); U.S. Pat. No. 6,408,878 (Microfabricated elastomeric valve and pump systems); U.S. Pat. No. 6,645, 432 (Microfluidic systems including three-dimensionally arrayed channel networks); U.S. Patent Application publication Nos. 2004/0115838, 20050072946; 20050000900;

20020127736; 20020109114; 20040115838; 20030138829; 20020164816; 20020127736; and 20020109114; PCT patent publications WO 2005/084191; WO05030822A2; and WO 01/01025; Quake & Scherer, 2000, "From micro to nanofabrication with soft materials" *Science* 290: 1536-40; Xia et al., 1998, "Soft lithography" Angewandte Chemie-International Edition 37:551-575; Unger et al., 2000, "Monolithic microfabricated valves and pumps by multilayer soft lithography" *Science* 288:113-116; Thorsen et al., 2002, "Microfluidic large-scale integration" *Science* 298:580-584; Liu et al., 2003, "Solving the "world-to-chip" interface problem with a microfluidic matrix "*Analytical Chemistry* 75, 4718-23," all of which are incorporated herein by reference.

Elastomeric Materials

Elastomers in general are polymers existing at a temperature between their glass transition temperature and liquefaction temperature. See Allcock et al., *Contemporary Polymer Chemistry*, 2nd Ed. Elastomeric materials exhibit elastic properties because the polymer chains readily undergo torsional motion to permit uncoiling of the backbone chains in response to a force, with the backbone chains recoiling to assume the prior shape in the absence of the force. In general, elastomers deform when force is applied, but then return to their original shape when the force is removed. The elasticity exhibited by elastomeric materials may be characterized by a Young's modulus. Elastomeric materials having a Young's modulus of between about 1 Pa-1 TPa, more preferably between about 10 Pa-100 GPa, more preferably between about 20 Pa-1 GPa, more preferably between about 50 Pa-10 MPa, and more preferably between about 100 Pa-1 MPa are useful in accordance with the present invention, although elastomeric materials having a Young's modulus outside of these ranges could also be utilized depending upon the needs of a particular application.

Given the tremendous diversity of polymer chemistries, precursors, synthetic methods, reaction conditions, and potential additives, there are a huge number of possible elastomer systems that could be used to make the devices of the invention. Common elastomeric polymers include perfluoropolyethers, polyisoprene, polybutadiene, polychloroprene, polyisobutylene, poly(styrene-butadiene-styrene), polyurethanes, and silicones, for example, or poly(bis(fluoroalkoxy) phosphazene) (PNF, Eypel-F), poly(carborane-siloxanes) (Dexsil), poly(acrylonitrile-butadiene) (nitrile rubber), poly (1-butene), poly(chlorotrifluoroethylene-vinylidene fluoride) copolymers (Kel-F), poly(ethyl vinyl ether), poly(vinylidene fluoride), poly(vinylidene fluoride-hexafluoropropylene) copolymer (Viton), elastomeric compositions of polyvinylchloride (PVC), polysulfone, polycarbonate, polymethylmethacrylate (PMMA), and polytertrafluoroethylene (Teflon), polydimethylsiloxane, polydimethylsiloxane copolymer, and aliphatic urethane diacrylate. For illustration, a brief description of the most common classes of elastomers is presented here:

Silicones:

Silicone polymers have great structural variety, and a large number of commercially available formulations. In an exemplary aspect of the present invention, the present systems are fabricated from an elastomeric polymer such as GE RTV 615 (formulation), a vinyl-silane crosslinked (type) silicone elastomer (family). The vinyl-to-(Si—H) crosslinking of RTV 615 allows both heterogeneous multilayer soft lithography and photoresist encapsulation. However, this is only one of several crosslinking methods used in silicone polymer chemistry and suitable for use in the present invention. In one embodiment, the silicone polymer is polydimethylsiloxane (PDMS).

Perfluoropolyethers:

Functionalized photocurable perfluoropolyether (PFPE) is particularly useful as a material for fabricating solvent-resistant microfluidic devices for use with certain organic solvents. These PFPEs have material properties and fabrication capabilities similar to PDMS but with compatibility with a broader range of solvents. See, e.g., PCT Patent Publications WO 2005030822 and WO 2005084191 and Rolland et al., 2004, "Solvent-resistant photocurable "liquid Teflon" for microfluidic device fabrication" *J. Amer. Chem. Soc.* 126: 2322-2323.

Polyisoprene, Polybutadiene, Polychloroprene:

Polyisoprene, polybutadiene, and polychloroprene are all polymerized from diene monomers, and therefore have one double bond per monomer when polymerized. This double bond allows the polymers to be converted to elastomers by vulcanization (essentially, sulfur is used to form crosslinks between the double bonds by heating). Homogeneous multilayer soft lithography would involve incomplete vulcanization of the layers to be bonded and photoresist encapsulation would be possible by a similar mechanism.

Polyisobutylene:

Pure Polyisobutylene has no double bonds, but is crosslinked to use as an elastomer by including a small amount (~1%) of isoprene in the polymerization. The isoprene monomers give pendant double bonds on the polyisobutylene backbone, which may then be vulcanized as above.

Poly(Styrene-Butadiene-Styrene):

Polystyrene-butadiene-styrene) is produced by living anionic polymerization (that is, there is no natural chain-terminating step in the reaction), so "live" polymer ends can exist in the cured polymer. This makes it a natural candidate for the present photoresist encapsulation system (where there will be plenty of unreacted monomer in the liquid layer poured on top of the cured layer). Incomplete curing would allow homogeneous multilayer soft lithography (A to A bonding). The chemistry also facilitates making one layer with extra butadiene ("A") and coupling agent and the other layer ("B") with a butadiene deficit (for heterogeneous multilayer soft lithography). SBS is a "thermoset elastomer", meaning that above a certain temperature it melts and becomes plastic (as opposed to elastic); reducing the temperature yields the elastomer again. Thus, layers can be bonded together by heating.

Polyurethanes:

Polyurethanes are produced from di-isocyanates (A-A) and di-alcohols or di-amines (B-B); since there are a large variety of di-isocyanates and di-alcohols/amines, the number of different types of polyurethanes is huge. The A vs. B nature of the polymers, however, would make them useful for heterogeneous multilayer soft lithography just as RTV 615 is: by using excess A-A in one layer and excess B-B in the other layer.

The selection of materials (whether elastomeric or non-elastomeric) will take into account the need for particular material properties and will depend on a variety of factors including: ease of manufacture, the nature of the chemical synthesis, solvent resistance and temperature stability. For example, fluidic circuits fabricated from PDMS will not be compatible with all organic solvents (see, e.g., Lee et al., 2003, *Anal. Chem.* 75:6544-54). This issue can be addressed by the use of chemically resistant elastomers in place of PDMS in at least some regions of the device. For example, perfluoropolyether (PFPE) can be used (see Rolland et al., 2004, "Solvent-resistant photocurable "liquid Teflon" for microfluidic device fabrication" *J. Amer. Chem. Soc.* 126:

2322-23, and citations herein above). Alternatively, the elastomer (e.g., PDMS) surface can be chemically modified to increase compatibility with organic solvents and improve function Methods and reagents for such modification include those described in U.S. 2004/0115838 [para. 0293] et seq.; copolymers of tetrafluoroethylene, perfluoromethylvinylether (also called TFE-perfluorovinylether polymers) such as Chemraz (Greene-Tweed, 10% solution) diluted 1:1 in low boiling point perfluorocarbon liquid, e.g. Flourinert from 3M), Kalrez (Du Pont), Chemtex (Utex Industries), and fluorocarbon polymers (FKM, e.g. poly(tetrafluoro-cohexafluoropropylene) such as Cytop coating (poly(perfluoro (alkenyl vinyl ether) from Bellex International Corp. and Novec EGC-1700 coating (fluoroaliphatic polymer) from 3M which can be applied by flushing the solutions though channels (e.g., 3× 40 microliters at 25 psi, at 1 min intervals). In addition, many chemical reactions can be carried out in a variety of solvents. Reaction series to be carried out in a chip made using particular materials can be designed to use solvents that are compatible with the materials over the period of time necessary to complete the reaction.

For devices made using multilayer soft lithography (in which layers of elastomer are cured separately and then bonded together) another important consideration for fabrication is the ability to bond multiple layers of elastomers together. This scheme requires that cured layers possess sufficient reactivity to bond together. Either the layers may be of the same type, and are capable of bonding to themselves, or they may be of two different types, and are capable of bonding to each other. Other possibilities include the use an adhesive between layers, the use of thermoset elastomers, and use of composite structures.

Elastomeric Fabrication Methods

Methods of fabrication of complex microfluidic circuits using elastomeric are known and are described in Unger et al., 2000, Science 288:113-116; Quake & Scherer, 2000, "From micro to nanofabrication with soft materials" Science 290: 1536-40; Xia et al., 1998, "Soft lithography" Angewandte Chemie-International Edition 37:551-575; Unger et al., 2000, "Monolithic microfabricated valves and pumps by multilayer soft lithography" Science 288:113-116; Thorsen et al., 2002, "Microfluidic large-scale integration" Science 298: 580-584; Chou et al., 2000, "Microfabricated Rotary Pump" Biomedical Microdevices 3:323-330; Liu et al., 2003, "Solving the "world-to-chip" interface problem with a microfluidic matrix "Analytical Chemistry 75, 4718-23," and other references cited herein and known in the art.

Microfluidic devices are generally constructed utilizing single and multilayer soft lithography (MSL) techniques and/ or sacrificial-layer encapsulation methods. The basic MSL approach involves casting a series of elastomeric layers on a micro-machined mold, removing the layers from the mold and then fusing the layers together. In the sacrificial-layer encapsulation approach, patterns of photoresist are deposited wherever a channel is desired. One exemplary method for fabricating elastomeric devices is briefly described below.

In brief, one method for fabricating elastomeric devices involve fabricating mother molds for top layers (the elastomeric layer with the control channels and reactors, the elastomeric layer with the flow channels) on silicon wafers by photolithography with photoresist (Shipley SJR 5740). Channel heights can be controlled precisely by the spin coating rate. Photoresist channels are formed by exposing the photoresist to UV light followed by development. Heat reflow process and protection treatment is typically achieved as described by Unger et al. supra. A mixed two-part-silicone elastomer (GE RTV 615) is then spun into the bottom mold and poured onto the top mold, respectively. Spin coating can be utilized to control the thickness of bottom polymeric fluid layer. The partially cured top layer is peeled off from its mold after baking in the oven at 80° C. for 25 minutes, aligned and assembled with the bottom layer. A 1.5-hour final bake at 80° C. is used to bind these two layers irreversibly. Once peeled off from the bottom silicon mother mold, this RTV device is typically treated with HCl (0.1N, 30 min at 80° C.). This treatment acts to cleave some of the Si—O—Si bonds, thereby exposing hydroxy groups that make the channels more hydrophilic.

The device can then optionally be hermetically sealed to a support. The support can be manufactured of essentially any material, although the surface should be flat to ensure a good seal, as the seal formed is primarily due to adhesive forces. Examples of suitable supports include glass, plastics and the like.

The devices formed according to the foregoing method result in the substrate (e.g., glass slide) forming one wall of the flow channel. Alternatively, the device once removed from the mother mold is sealed to a thin elastomeric membrane such that the flow channel is totally enclosed in elastomeric material. The resulting elastomeric device can then optionally be joined to a substrate support.

Access to the fluidic channels is achieved by punching holes through the bulk material, and the devices are readily bonded to glass or silicon substrates. Large arrays of active components, such as channels, reactors, valves and pumps, can be created by stacking multiple, individually fabricated layers.

Composite Structures

Diverse materials can be used in fabrication of the chip and reactor. Devices, and in particular, reactors, can be fabricated from combinations of materials. For example, in some embodiments the walls and ceiling of a reactor are elastomeric and the floor of the reactor is formed from an underlying nonelastomeric substrate (e.g., glass), while in other embodiments, both the walls and floors of the reactor are constructed from a nonelastomeric material, and only the ceiling of the reactor is constructed from elastomer. These chips and reactors are sometimes referred to as "composite structures." See, e.g., U.S. 20020127736. A variety of approaches can be employed to seal the elastomeric and non-elastomeric components of a device, some of which are described in U.S. Pat. No. 6,719,868 and U.S. 20020127736, ¶¶0227 et seq.

Valves

Valves of the microfluidic device can be selectively actuated to regulate flow in and between channels, chambers, and other chip components. Valves of various types are known in the art, including micromechanical valves, elastomeric valves, solid-state microvalves, and others. See, e.g., Felton, 2003, The New Generation of Microvalves" Analytical Chemistry 429-432. Two common approaches to fabrication of microelectromechanical (MEMS) structures such as pumps and valves are silicon-based bulk micro-machining (which is a subtractive fabrication method whereby single crystal silicon is lithographically patterned and then etched to form three-dimensional structures), and surface micro-machining (which is an additive method where layers of semiconductor-type materials such as polysilicon, silicon nitride, silicon dioxide, and various metals are sequentially added and patterned to make three-dimensional structures).

In one embodiment, the valve is a monolithic valve. In a preferred embodiment the valve is a pressure-actuated "elastomeric valve." A pressure-actuated elastomeric valve consists of a configuration in which two microchannels are separated by an elastomeric segment that can be deflected into or retracted from one of the channels (e.g., a flow channel) in response to an actuation force applied to the other channel (e.g., a control channel). Examples of elastomeric valves include upwardly-deflecting valves (see, e.g., U.S. 20050072946), downwardly deflecting valves (see, e.g., U.S. Pat. No. 6,408,878), side actuated valves (see, e.g., U.S. 20020127736, e.g., paragraphs 0215-0219], normally-closed valves (see, e.g., U.S. Pat. No. 6,408,878 B2 and U.S. Pat. No. 6,899,137) and others. In some embodiments a device can have a combination of valves (e.g., upwardly and downwardly deflecting valves). Valves can be actuated by injecting gases (e.g., air, nitrogen, and argon), liquids (e.g., water, silicon oils and other oils), solutions containing salts and/or polymers (including but not limited to polyethylene glycol, glycerol and carbohydrates) and the like into the control channel. Some valves can be actuated by applying a vacuum to the control channel.

Generally, the multilayer microfluidic device discussed herein includes a number of elastomeric layers and the valves include a deflectable membrane between the first layer and the second layer. In a "push-up" configuration, the deflectable membrane of the valve is deflectable into the fluid line 514 positioned above the intersection with the control line. In this configuration, the deflectable membrane deflects up into the fluid line to close the fluid line at the position of the valve, thus the reference to "push-up" valves. Releasing the pressure in the control line will result in the deflectable membrane returning to the undeflected position and thereby opening of the closed valve. Additional description of microfluidic devices including valves is provided in U.S. Patent Application No. 2005/0226742, the entire disclosure of which is hereby incorporated by reference in its entirety for all purposes.

In addition to elastomeric valves actuated by pressure-based actuation systems, monolithic valves with an elastomeric component and electrostatic, magnetic, electrolytic and electrokinetic actuation systems may be used. See, e.g., U.S. 20020109114; U.S. 20020127736, e.g., ¶¶ 0168-0176; and U.S. Pat. No. 6,767,706 B2 e.g., §6.3. One-way valves have also been described (see, e.g., Adams et al., 2005, *J. Micromech. Microeng.* 15:1517-21; and references 6-12 therein).

Examples

FIG. 1 depicts the microfluidic chip layout used in the experiments. Inside the PCR units, there are reaction chambers (larger size square), reagent chambers (smaller size square) and their guard valves (I or C). The guard valves are useful for the chip performance during the thermal cycling. The valve I can also be treated as inlets or outlet valves during washing to control the liquid flow direction. Out of the high throughput PCR matrix, there are two control lines P1 and P2, which also serve as inlets and outlets valves during chip washing. During PCR thermal cycling, only guard valves I and C are activated and P1 and P2 are ignored. After PCR, the valve pairs of P1/P2 and I/P1 will serve as pumping valves to direct the flow direction to clean either reaction chambers or both reaction and reagent chambers. For example, when cleaning the reaction chambers, the guard valve I was pressurized and closed. P1 and P2 were used for cleaning liquid control.

A nucleic acid inactivating solution (bleach) was loaded into chip and was pressurized into sample bus line (S in the figure). It could go into chamber (P1 was close and P2 was open) and stayed in the chamber (P1 and P2 were closed). Because the microfluidic chip was made with elastomeric material (PDMS), extra pressure could be trapped inside the expanded reaction chamber. The washing liquid was then released when P1 was open and P2 was closed. The solution inside the chambers was replaced by dilation pumping. The same way, both reaction chambers and reagent chambers were cleaned by dilation pump valve I and P1 from assay line (A in the figure). Valve P2 was closed and liquid from assay line was pressurized. The washing solution could pass from assay lines through reagent-reaction chambers and went out of the chip by switching valves of I and P1. By switching the valves of P1, P2 and I, the dilation pumping mode could be sample side only, assay side only, one cycle sample side push followed by one cycle assay side push, or 5-cycle sample side pushes followed by 2-cycle assay side pushes. The combination could relate to the chamber volume ratio or any other preferences.

Figure 2:
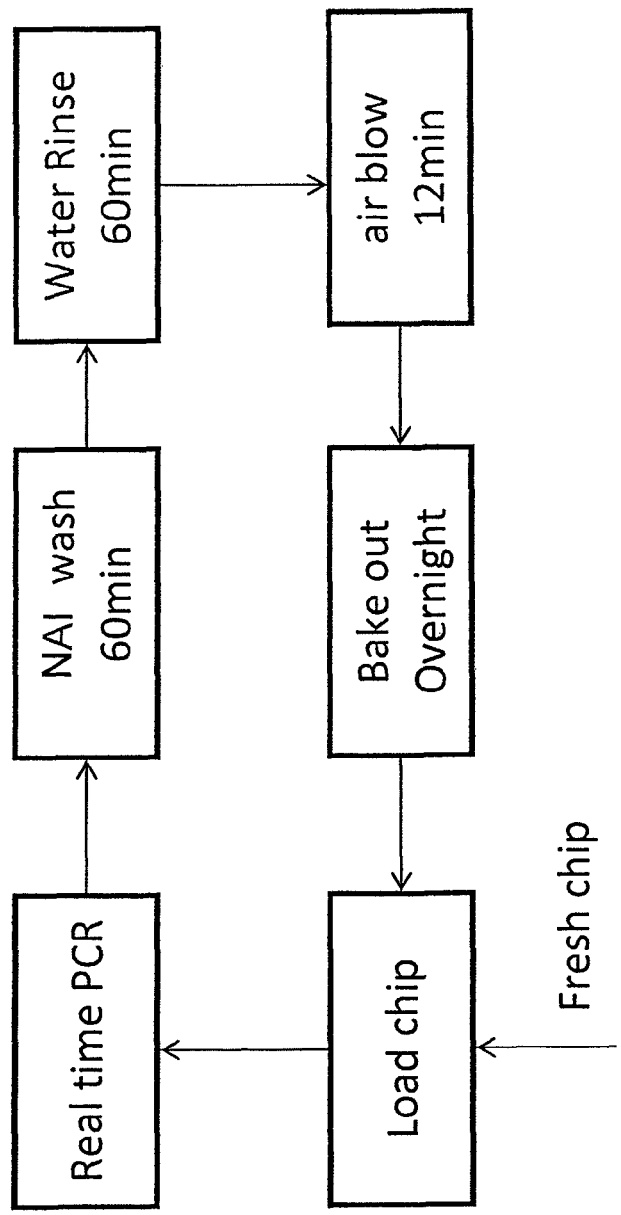
FIG. 2 is a flow chart summarizing use of a regenerated microfluidic chip. "NAI solution" is "nucleic acid inactivating solution."

FIG. 2 provides an exemplary workflow for a chip use and regeneration. A fresh or regenerated chip is loaded for real time PCR. The used chip can be regenerated by washing with a nuclei acid inactivating solution (e.g. a bleach) followed by a water rinse. The washing time includes the liquid pumping time and incubation time at room temperature. The washing time is around one hour in this specific design. It could be further optimized based on different chip designs and chemistry applications. After wash, the washing liquid evaporated out at elevated temperature. The regenerated chip then goes into the next cycle. It will be recognized that FIG. 2 is for illustration not limitation.

To test the regeneration process, a series of real time PCR were carried out, in two halves of the same chip. One half of the reaction chambers were loaded with genomic DNA and GAPDH primers as a positive control. The other half of the chambers were loaded with no template controls (NTC) and GAPDH primers as negative controls. In the positive control portion, reactions were detected with the expected cycle threshold values (Cts) and uniform standard deviation between chambers. When the chip was regenerated and reactions repeated on the opposite halves of the chip, no contamination was observed. Reactions were conducted under similar conditions (the same genomic DNA plus GAPDH primers) except the positive control reactions were conducted on the opposite side of the chip (i.e., the side that was negative in the prior round). The reactions gave a similar result (similar Cts). The negative controls reactions were also conducted on the opposite portion of the chip, and showed that neither the templates nor the PCR products from previous reaction were carried over to this reaction. This experiment demonstrated the successful regeneration of the microfluidic chip.

FIG. 4 illustrates continuous PCR results in six use-regeneration-use-regeneration cycles in two chips. In each reaction, the chip was loaded with both positive and negative controls as described above. The positive and negative heat maps were obtained to check the validity of regeneration. The Cts and standard deviation of Cts were checked for the two microfluidic chips. As shown in the figure, all the positive reactions had similar Ct values and similar Ct standard deviation. Importantly, both the Cts and standard deviation did not degrade along with the reuse and regeneration.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for removing nucleic acid from reaction chambers in a microfluidic device, wherein the device comprises:
   (1) a microfluidic delivery channel with an input at one end and an output at the other end;

(2) microfluidic reaction chambers each having at least one wall formed from an elastomeric material, the reaction chambers being connected with the delivery channel between the input and output;
(3) an input valve between the input and the microfluidic reaction chambers; and
(4) an output valve between the microfluidic reaction chambers and the output; wherein the method for removing nucleic acid includes the following steps:
(a) introducing a nucleic acid inactivating solution into the delivery channel under pressure through the input with the input valve open and the output valve closed, thereby increasing volume of the reaction chambers by expanding their elastomeric walls outwards;
(b) closing the input valve; then
(c) opening the output valve, allowing the reaction chambers to return to their unpressurized volume and forcing solution out through the output;
(d) repeating steps (a) to (c) so as to remove or inactivate residual nucleic acid from the reaction chambers.

2. The method of claim 1, further comprising:
(e) introducing a wash solution into the delivery channel under pressure through the input with the input valve open and the output valve closed, thereby increasing volume of the reaction chambers by expanding their elastomeric walls outwards;
(f) closing the input valve; then
(g) opening the output valve, allowing the reaction chambers to return to their unpressurized volume and forcing solution out through the output;
(h) repeating steps (e) to (g) so as to wash the nucleic acid inactivating solution from the reaction chambers.

3. The method of claim 1, further comprising:
(i) introducing a second nucleic acid inactivating solution into the delivery channel under pressure through the input with the input valve open and the output valve closed, thereby increasing volume of the reaction chambers by expanding their elastomeric walls outwards;
(ii) closing the input valve; then
(iii) opening the output valve, allowing the reaction chambers to return to their unpressurized volume and forcing solution out through the output;
(iv) repeating steps (i) to (iii) so as to replace the nucleic acid inactivating solution introduced in steps (a) to (d) with the second nucleic acid inactivating solution.

4. The method of claim 1, wherein the nucleic acid inactivating solution comprises sodium hypochlorite (bleach).

5. The method of claim 1, wherein the nucleic acid inactivating solution contains an agent selected from hydrogen peroxide, DNAase, psoralen, sodium hydroxide, and combinations thereof.

6. The method of claim 1, wherein the reaction chambers are in line with the delivery channel.

7. The method of claim 1, wherein each reaction chamber has a single connection, the single connection being a connection to the delivery channel.

8. The method of claim 1, wherein each reaction chamber has a connection to the delivery channel and a connection through an interface channel to a reagent chamber.

9. The method of claim 8, wherein the interface channels are open, and the inactivating solution is pumped through both the reaction chambers and the reagent chambers.

10. The method of claim 8, wherein valves on the interface channels are closed, and the inactivating solution is pumped through the reaction chambers.

11. The method of claim 8, wherein valves on the interface channels are closed, and the inactivating solution is pumped through the reagent chambers.

12. The method of claim 1, wherein the dilation pumping causes a fluid flow rate through the microfluidic space of less than 50 μL/hr.

13. The method of claim 1, wherein the nucleic acid inactivating solution is introduced into the channel at multiple points spaced along the delivery channel.

14. The method of claim 2, wherein both the nucleic acid inactivating solution and the wash solution flow from microfluidic reaction chambers at multiple points spaced along the delivery channel.

15. The method of claim 1, wherein the delivery channel and reaction chambers are made of the elastomer polydimethylsiloxane (PDMS).

16. The method of claim 1, whereby the microfluidic device is rendered suitable for reuse through at least five rounds of nucleic acid amplification reactions without an increase in false positives.

17. A method of analyzing nucleic acid in a microfluidic device, wherein the device comprises:
(1) a microfluidic delivery channel having an input at one end and an output at the other end;
(2) microfluidic reaction chambers with at least one wall formed from an elastomeric material, the reaction chambers being connected with the delivery channel between the input and output;
(3) an input valve between the input and the microfluidic reaction chambers; and
(4) an output valve between the microfluidic reaction chambers and the output; wherein the method of analyzing includes multiple cycles of the following steps:
(A) delivering separate samples into the reaction chambers of the device;
(B) amplifying the samples in the reaction chambers;
(C) detecting product formed by the amplifying; and then
(D) regenerating the device according to the method of claim 1.

18. The method of claim 17, which is a method of conducting real-time PCR analysis of the separate samples.

19. The method of claim 17, wherein the device is dried after step (D) before repeating steps (A) to (C).

20. The method of claim 17, wherein at least five of the cycles are conducted without an increase in false positives.

* * * * *